(12) United States Patent
Riera Jorba et al.

(10) Patent No.: US 7,260,552 B2
(45) Date of Patent: Aug. 21, 2007

(54) SECURE REMOTE ELECTRONIC VOTING SYSTEM AND CRYPTOGRAPHIC PROTOCOLS AND COMPUTER PROGRAMS EMPLOYED

(75) Inventors: Andreu Riera Jorba, Santpedor (ES); Jordi Castella Roca, Menarguens (ES)

(73) Assignee: SCYTL Online World Security, SA, Barcelona (ES)

( * ) Notice: Subject to any disclaimer, the term of this patent is extended or adjusted under 35 U.S.C. 154(b) by 0 days.

(21) Appl. No.: 10/866,092

(22) Filed: Jun. 14, 2004

(65) Prior Publication Data

US 2005/0021479 A1 Jan. 27, 2005

Related U.S. Application Data

(63) Continuation of application No. PCT/ES02/00423, filed on Sep. 9, 2002.

(30) Foreign Application Priority Data

Dec. 12, 2001 (WO) ...................... PCT/ES01/00482

(51) Int. Cl.
*G06Q 99/00* (2006.01)
*H04K 1/00* (2006.01)
*H04L 9/00* (2006.01)

(52) U.S. Cl. .............................. 705/12; 705/1; 705/50; 705/64; 705/67; 713/150; 713/155; 713/171; 713/182; 380/44; 380/59; 380/277

(58) Field of Classification Search .................... 705/1, 705/12, 50, 51, 64; 235/386; 713/150, 155, 713/171, 182; 380/44, 59, 277
See application file for complete search history.

(56) References Cited

U.S. PATENT DOCUMENTS

| | | | |
|---|---|---|---|
| 4,759,063 A | 7/1988 | Chaum | 380/30 |
| 5,495,532 A | 2/1996 | Kilian et al. | 380/30 |
| 5,682,430 A | 10/1997 | Kilian et al. | 380/30 |
| 6,021,200 A | 2/2000 | Fischer | 380/23 |
| 6,081,793 A | 6/2000 | Challener et al. | 705/50 |
| 6,092,051 A | 7/2000 | Kilian et al. | 705/12 |

(Continued)

FOREIGN PATENT DOCUMENTS

EP 1017025 A2 7/2000

(Continued)

OTHER PUBLICATIONS

WAP Forum, *Wireless Transport Layer Security specification*, Version Jun. 29, 2001.

(Continued)

*Primary Examiner*—Kambiz Abdi
(74) *Attorney, Agent, or Firm*—Jacobson Holman PLLC

(57) ABSTRACT

The method employs interrelated cryptographic processes and protocols to provide reliability to vote casting, ballots recount, and verification of vote or poll results. These cryptographic processes and protocols jointly constitute a cryptographic voting scheme capable of meeting the specific reliability requirements of an electronic voting where voters remotely cast their votes. These reliability requirements include voter authentication and privacy; accurate results, the impossibility of coercion and sale of votes, verifying the final results and, if necessary, the secrecy of intermediate results before completing the vote or poll. The cryptographic voting method minimizes the confidence level to be placed on any of the electronic voting individual party and participants.

40 Claims, 12 Drawing Sheets

U.S. PATENT DOCUMENTS

| | | | | |
|---|---|---|---|---|
| 6,317,833 | B1 | 11/2001 | Jakobsson | 713/181 |
| 6,873,966 | B2* | 3/2005 | Babbitt et al. | 705/12 |
| 7,036,730 | B2* | 5/2006 | Chung | 235/386 |
| 2001/0013547 | A1* | 8/2001 | Kotob et al. | 235/386 |
| 2002/0077885 | A1* | 6/2002 | Karro et al. | 705/12 |
| 2002/0077887 | A1* | 6/2002 | London Shrader et al. | 705/12 |
| 2003/0034393 | A1* | 2/2003 | Chung | 235/386 |
| 2003/0159032 | A1* | 8/2003 | Gerck | 713/156 |

FOREIGN PATENT DOCUMENTS

| | | |
|---|---|---|
| WO | WO01/20562 | 3/2001 |

OTHER PUBLICATIONS

Dierks et al, *The TLS protocol*, version 1.0 Request for Comments 2246, pp. 1-80, 1999.

Freier et al, The SSL protocol, version 3.0 Internet-Draft, pp. 1-56, Mar. 1996.

Rivest et al, Communications of the ACM, vol. 21, No. 2, Feb. 1978 pp. 120-126, *A method for obtaining digital signatures and ....*

Chaum, Communications of the ACM, vol. 24, No. 2, pp. 84-88, 1981 *Untraceable electronic mail, return addresses and digital ....*

Park et al, Proc of Eurocrypt '93, LNCS 765, pp. 248-259, 1993, *Efficient anonymous channel and all/nothing election scheme.*

Benaloh et al, Proc of 5th Annual ACM Symposium ..., pp. 52-62, 1986, *Distributing the power of a government to enhance the ....*

Sako et al, Proc of Crypto '94, LNCS 839, pp. 411-424, 1994, *Secure voting using partially compatible homomorphisms.*

Cramer et al, Proc of Eurocrypt '96, LNCS 1070, pp. 72-83, 1996 *Multi-authority secret-ballot elections with linear work.*

Cramer et al, Proc of Eurocrypt '97, LNCS 1233, pp. 103-118, 1997, *A secure and optimally efficient multi-authority ....*

ITU-T, *Recommendation X.509* (Aug. 1997) *Information Technology—Open Systems Interconnection—the Directory ...*, 1997.

National Bureau of Standards, NBS FIPS Pub 46-1, *Data Encryption Standard*, U.S. Department of Commerce, 1988.

ANSI X9.17 (Revised), *American National Standard for Financial Institution Key Management (Wholesale)*, American Bankers, 1985.

Daemen et al, *The Block Cipher Rijndael*, Smart Card Research and Applns., LNCS 1820, pp. 288-296, 2000.

PKCS@7, *Cryptographic Message Syntax Standard*, An RSA Laboratory Technical Note, Version 1.5, Nov. 1993, pp. 1-24.

Rivest et al, *A Method for Obtaining Digital Signatures and Public Key ...*, Comm of the ACM, vol. 21, No. 2, pp. 12-126, 1978.

Shamir, *How to Share a Secret*, Communications of the ACM, vol. 24 No. 11, pp. 612-613, Nov. 1979.

Tompa et al, How to Share a Secret with Cheaters, Journal of Cryptology, vol. 1, No. 2, pp. 133-138, 1988.

Ingemarsson et al, *A Protocol to Set Up Shared Secret Schemes ...* Adv in Cryptology EUROCRYPT '90, Proc, pp. 266-282, 1991.

Desmedt et al, *Threshold Cryptosystems*, Advances in Cryptology CRYPTO '89 Proceedings, pp. 307-315, 1990.

Desmedt et al, *Shared Generation of Authentication ...*, Advances in Cryptology CRYPTO '91 Proceedings, pp. 457-469, 1992.

Riera et al, *An uncoercible verifiable electronic voting protocol*, Proc of the IFIP SEC '98 Conf, pp. 206-215, 1998.

Blum et al, *An Efficient Probabilistic Public Key Encryption ...*, Advances in Cryptology CRYPTO '84 Proc, pp. 289-299, 1985.

Gülcü et al, Mixing E-mail with BABEL, ISOC Symposium on Network and Distributed System Security, 1996, pp. 1-15.

Riera et al, Practical approach to anonymity in large scale ..., Proc. of 1999 Network ... Symposium, pp. 69-82, 1999.

Electronic Voting Protocol Diagram, 1 page.

Master's Thesis of Chun-CHieh Hsu, *An Internet Voting Scheme for Large-Scale Elections*, pp. 1-38.

\* cited by examiner

OPENING ORDER 402

| Election Identifier | Polling Station Identifier | Polling Station State OPEN | Issuing Voting Confirmations Chance | Opening Date and Time | Signature of OPENING ORDER by the ELECTORAL BOARD |
|---|---|---|---|---|---|

FIG. 4

CLOSING ORDER 602

| Election Identifier | Polling Station Identifier | Polling Station State CLOSED | Opening Date and Time | Signature of CLOSING ORDER by the ELECTORAL BOARD |
|---|---|---|---|---|

FIG. 6

SECURE REMOTE ELECTRONIC VOTING SYSTEM AND CRYPTOGRAPHIC PROTOCOLS AND COMPUTER PROGRAMS EMPLOYED

This is a continuation of PCT/ES02/00423 filed Sep. 9, 2002 and published in Spanish.

FIELD OF THE INVENTION

The present invention refers to electronic voting, and more specifically to cryptographic protocols and processes as well as computer programs for implementing them, employed to provide preferably remote electronic voting system with the suitable digital safety measures.

In this specification, any ordered set of steps for transforming the information which includes cryptographic operations will be understood as cryptographic process. The term "cryptographic protocol" will be used herein to refer to a cryptographic process carried out between several participants who exchange information through any data communication system. On the other hand, cryptographic scheme refers to a number of interlinked cryptographic processes and protocols having a common aim.

According to said nomenclature, the object of this invention is to provide a secure electronic voting method including a cryptographic scheme to conduct with the utmost confidence any electoral processes and poll through communication networks such as Internet, wireless data communication networks or any other kind of computer network.

The description of the invention contains material which can be protected by copyright. The proprietors of said copyright have no objection to the reproduction of the description of this document of application of a patent as it will be published or final version at the Patent Office by third parties, but they reserve any right on the copyright in other aspect arising from said document.

BACKGROUND OF THE INVENTION

In a remote electronic voting or poll system, a plurality of authorized voters cast their vote or opinion from given vote casting devices to a virtual voting centre, through a communication network. A server or a plurality of them constitute that virtual polling station and they are responsible for accepting connections from voters and recording their votes or opinion issued for their further Tallying and tabulation. After they are tabulated, the results of the poll are finally published, probably through the communication network itself.

It is clear that some safety features must be included in this kind of remote electronic voting systems. Voting in the traditional way (i.e. casting a physical ballot at a true polling station) is done with confidence because of the use of physical safety measures such as paper envelopes, guards, or physical ballot boxes. However, these kinds of measures for the physical protections are no longer useful in remote electronic voting systems. They must be replaced by suitable digital security measures, a task which involves complex problems, with a set of specific safety requirements. The voter's privacy, for example, is a central safety requirement at any electoral process and in many kinds of polls. Nobody (not even the electoral authorities nor the administrators of the voting serves) must be capable of correlating the voters with the votes cast. However, when casting their vote, the voters must be suitably identified through some authentication mechanism to prevent that non authorized voters vote or that authorized voters vote more than once. The accuracy of the results is also very important. Nobody must be capable of adding false ballots (may be in the name of the voters who abstained to vote), nor to erase or manipulate the valid votes cast. Another quality wished is the secrecy on any intermediate result while the poll is not complete, unless the characteristics of the process requires otherwise. The object of said secrecy is to prevent that the current state of the poll could affect the decision of some voters. Another very important safety requirement is to verify the final results. The voters must be capable of verifying that their respective votes have been correctly recorded. In the event of detecting any problem in the recount, the voters involved must be able to publicly evidence (without interfering with their privacy so doing) that their validated votes were not correctly treated. Lastly, the use of electronic voting systems must not expose the voters to coercion nor either facilitate sale of votes.

This kind of specific safety requirements for an electoral process cannot be solved only with the use of generic digital security measures current in the market, such as firewalls, demilitarized areas, coding of the data at the transfer level, etc. A correct solution must necessarily include a special purpose cryptographic scheme specifically designed for the problems that a remote electronic voting imposes. A cryptographic voting scheme accurately determines the steps and actions involved in the remote vote casting as well by the device issuing the votes used by the voter as by the corresponding voting server. The scheme also determines the cryptographic operations which must occur during the process of vote tallying and also for verifying the final results. Of course, a cryptographic voting scheme must also be completed with generic safety measures to maximise the safety and to best protect the full voting system.

The first cryptographic voting scheme was proposed by Chaum in 1981 (Chaum, D. *Untraceable electronic mail, return addresses and digital pseudonyms*. Communications of the ACM, v.24, n.2, pp. 84-88, 1981). Many other proposals followed, giving a large group of voting schemes, known as schemes based on mixing techniques or mixing. The fundamental principle of these schemes based on mixing consisted in casting votes to a virtual polling station through some kind of anonymous channel constructed in the communication network. Usually, said voting schemes used the technique of the blind digital signature disclosed in U.S. Pat. No. 4,759,063, to validate the votes without impairing the voters privacy. Among the voting schemes based on mixing, the most representative examples were disclosed in [Fujioka, A., Okamoto, T. & Ohta, K. *A practical secret voting scheme for large scale elections*. Proc. of Auscrypt '92, LNCS 718, pp. 244-251, 1992] and [Park, C., Itoh, K. & Kurosawa, K. *efficient anonymous channel and all/nothing election scheme*. Proc. of Eurocrypt '93, LNCS 765, pp. 248-259, 1993]. The invention disclosed in U.S. Pat. No. 6,317,833 is also based on mixing although in contrast with above mentioned proposals, the mixing process is not carried out in the communication channel but in the vote receiving centre. The voters protect their votes with the public key owned by the voting authority. Said authority is very similar to the character of the Electoral Board disclosed in [Borrell, J. Rifá, J. An implementable secure voting scheme. Computers & Security, 15, pp. 327-338, 1996]. Each voter requires a pair of asymmetric keys in order to sign the coded vote. In the description of the invention, it is only referred to the cryptosystem ElGamal [ElGamal, T., *A public key cryptosystem and a signature scheme based on*

*discrete logarithms*, Proc. of Crypto '84, LNCS 196, pp 10-18, 1985] as a means for said signature. It is then assumed that the pair of keys of each voter is to be brought in line with the cryptosystem ElGamal. Said requirement means a limitation in the voting scheme. In addition, the scheme does not offer any important benefit: the verifiability or the possibility that the voters verify the correct record of their votes when the process is complete.

A second group of cryptographic voting schemes, based on homomorphic coding techniques, was started with the work by Benaloh and Yung on 1986 [Benaloh, J. C. & Yung, M. *Distributing the power of a government to enhance the privacy of voters*. Proc. of $5^{th}$ Annual ACM Symposium on Principles of Distributed Computing, pp. 52-62, 1986]. These voting schemes avoided the use of anonymous channels by splitting individual votes into a number of pieces and sending each piece to a separate Tallying agent. Said agents counted the votes without the need of decoding them (for this they accounted on cryptographic mechanisms which secured the accurateness of the recount). Some representative examples of voting schemes based on homomorphic coding techniques have been recently proposed in [Sako, K. & Kilian, J. *Secure voting using partially compatible homomorphisms*. Proc. of Crypto '94, LNCS 839, pp. 411-424, 1994], [Cramer, R., Franklin, M., Schoenmakers, B. & Yung, M. *Multi-authority secret-ballot elections with linear work*. Proc. of Eurocrypt '96, LNCS 1070, pp. 72-83, 1996] and [Cramer, R., Gennaro, R. & Schoenmakers, B. *A secure and optimally efficient multi-authority election scheme*. Proc. of Eurocrypt '97, LNCS 1233, pp. 103-118, 1997]. The inventions of U.S. Pat. No. 5,495,532 and WO 0120562 both disclose voting schemes based on homomorphic coding techniques. Said schemes require computing resources significantly greater than those required for the schemes based on mixing, making impossible they are implemented in client devices having a low computing capacity. Another limitation to said schemes is that, due to their intrinsic characteristics they result absolutely incapable of supporting ballots having arbitrary formats.

Inventions U.S. Pat. No. 6,081,793 and U.S. Pat. No. 6,021,200 disclose rather simplistic cryptographic voting schemes based on the known "two-agency model". In general, these two voting schemes provides a solution to the safety requirements of elections only in the event that both agencies do not join in an unfair coalition and, in addition, it is necessary to place full confidence in some of the parts of the system. In the U.S. Pat. No. 6,081,793 the model uses an authenticator during the ballot casting process to detach the voter authentication of the encrypted ballot to prevent any vote-voter correlation of the results. This implementation has the limitation that the result counter needs to put trust in the authenticator, because the counter cannot check by itself that the ballot contents belong to a valid voter. In addition invention voters doesn't have a voting receipt to check the voting results. The method checks during the voting process that the ballot has been received by the authenticator. But this check doesn't provide to the voter a voting receipt to verify if the votes were received by the counter when it starts the counting process or so far.

In any cryptographic voting scheme, measures have to be taken designed to guarantee the verifiability of the final result of the vote cast by the voters and at same time measures for protecting against coercion to the voter by third parties as well as against the sale of votes by the voters themselves. The two sets of measures evidenced to be contradictory to each other. In fact, by facilitating the verifiability, the possibility of coercion and sale of votes is increased and if the possibility of coercion and the sale of votes is hindered the verifiability is also hindered. Two prior works simultaneously tried to overcome the two questions, although the proposals resulting from them are not implementable on regular communication networks. In U.S. Pat. No. 6,092,051 and EP1017025, voting cryptographic segments are disclosed which use an anonymous channel as the one disclosed in U.S. Pat. No. 5,682,430. Said channel must be physically protected against passive assailants who can steal information therefrom therefore the resulting voting systems cannot employ conventional data communication networks such as Internet.

SUMMARY OF THE INVENTION

This invention discloses a remote electronic voting method and the protocols and cryptographic processes used, which compose a cryptographic voting scheme.

The invention also refers to computer programs for implementing the said cryptographic processes and protocols.

A first object of this invention is to meet a comprehensive list of safety requirements associated to electronic elections and polls: voters privacy, authentication of authorized voters, accuracy of the results from the poll, secrecy of any intermediate results until poll is complete (if required), hindering voters coercion as well as the sale of votes, and verifying the end results. This invention allows minimizing the confidence level that must be placed in any of the elements and participants of the electronic voting thus meeting the list of safety requirements even in the case of malicious or corrupted system administrators, electoral authorities or voters.

This invention assures privacy to the voters by means of digital envelopes for the ballots, a secret shared cryptographic scheme among several electoral authorities and techniques of blind signatures or alternative protocols to validate the votes. The authentication of voters is preferably achieved by means of public key technology, [ITU-T, *Recommendation X.509* (August 1997) *Information Technology—Open Systems Interconnection—the Directory: Authentication Framework*, 199]) enabling, if required, a mechanism to avoid the installation of keys and digital certificates in the devices for issuing the voters own vote. The verifiability of the final results is based on digitally signed voting receipts matched with a highly reliable method for the voters downloading results. Accuracy of final results is secured by means of digital envelopes and proof of authenticity, with the support of digitally signed voting receipts. The secrecy of intermediate results, if required, is secured by means of digital envelopes. Preventing the coercion and the sale of the votes is based on a special design of the voting receipts and, if required, in the use of tamper-proof devices to prevent voters manipulate them.

It is another object of the invention to overcome the practical limitations and drawbacks of prior works on secure electronic voting methods. With regard to this, the invention includes only low-cost cryptographic processes and methods which advantageously allow the effective implementation in thin clients. Furthermore, the invention stands an absolute flexibility of ballot formats, including open-ended questions and write-in candidates which/who can be chosen just in the moment of voting. Furthermore, the invention removes the need for any kind of special communication channel such as a secure channel physically protected or an anonymous channel. Only regular data communication channels of any usual data communication network are needed.

It is yet another object of the invention to describe protocols alternative to the use of blind digital signatures to secure the privacy of the voters in cryptographic voting schemes based in mixing.

It is yet another object of this invention to describe secure mechanisms for the protocols of opening and closing the virtual polling stations.

Summarizing, this invention discloses a secure remote electronic voting method and the cryptographic voting protocol employed. The invention allows that electronic voting or polls through a regular communication network reach similar safety and confidence levels and in some aspects greater than that of traditional elections through physical means. Said object is reached by means of a secure electronic voting method comprising the steps detailed in claim one.

SHORT DESCRIPTION OF THE DRAWINGS

FIGS. 1a, 1b and 1c shows the main elements on which the electronic voting method of this invention is implemented. A plurality of Vote Casting Platforms 102 (where the Voter Agents 116 are executed a Polling Station 104, a Publication Site 106 and a Tally Site 108 are connected to each other through a Communication Network 114. Said elements can be found fully distributed and separated from each other, as shown in FIG. 1a. Also several levels of grouping can occur. FIG. 1b shows the configuration with the Polling Station 104 and the Publication Site 106 grouped. FIG. 1c shows a configuration with the Polling Station 104, the Publication Site 106 and the Tally Site 108. In any case, the Tally Site 108 is operated by an Electoral Board 110 constituted by several members and it is physically connected to the Communication Network 114 through a very secure network connection 112.

FIG. 4 shows the format of the opening order 402 that the Electoral Board 110 releases to the Polling Station 104. From the receipt of said order, the Polling Station 104 proceeds to accept connections from the Voter Agents 116.

FIG. 6 shows the format of the closing order 602 that the Electoral Board 110 releases to the Polling Station 104. From the receipt of said order, the Polling Station 104 is no longer accepting connections from the Voter Agents 116.

Figure 7A:
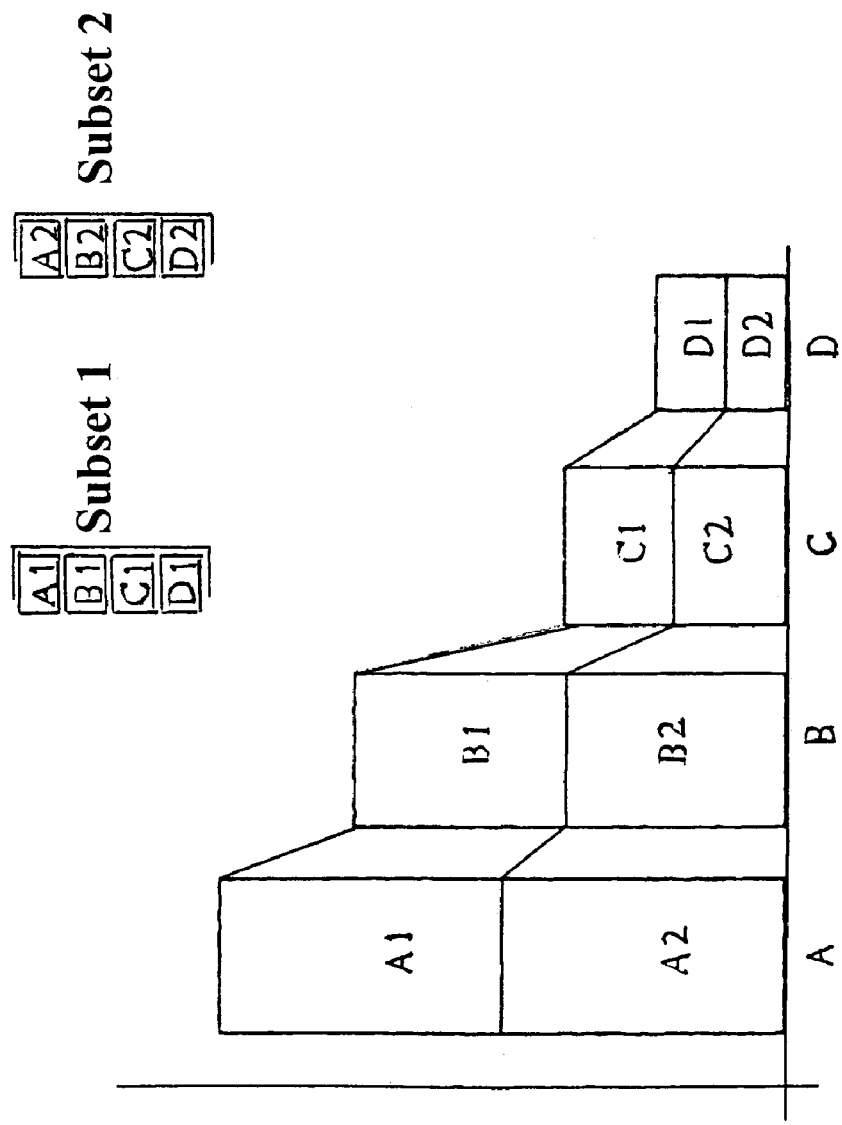
Figure 7:
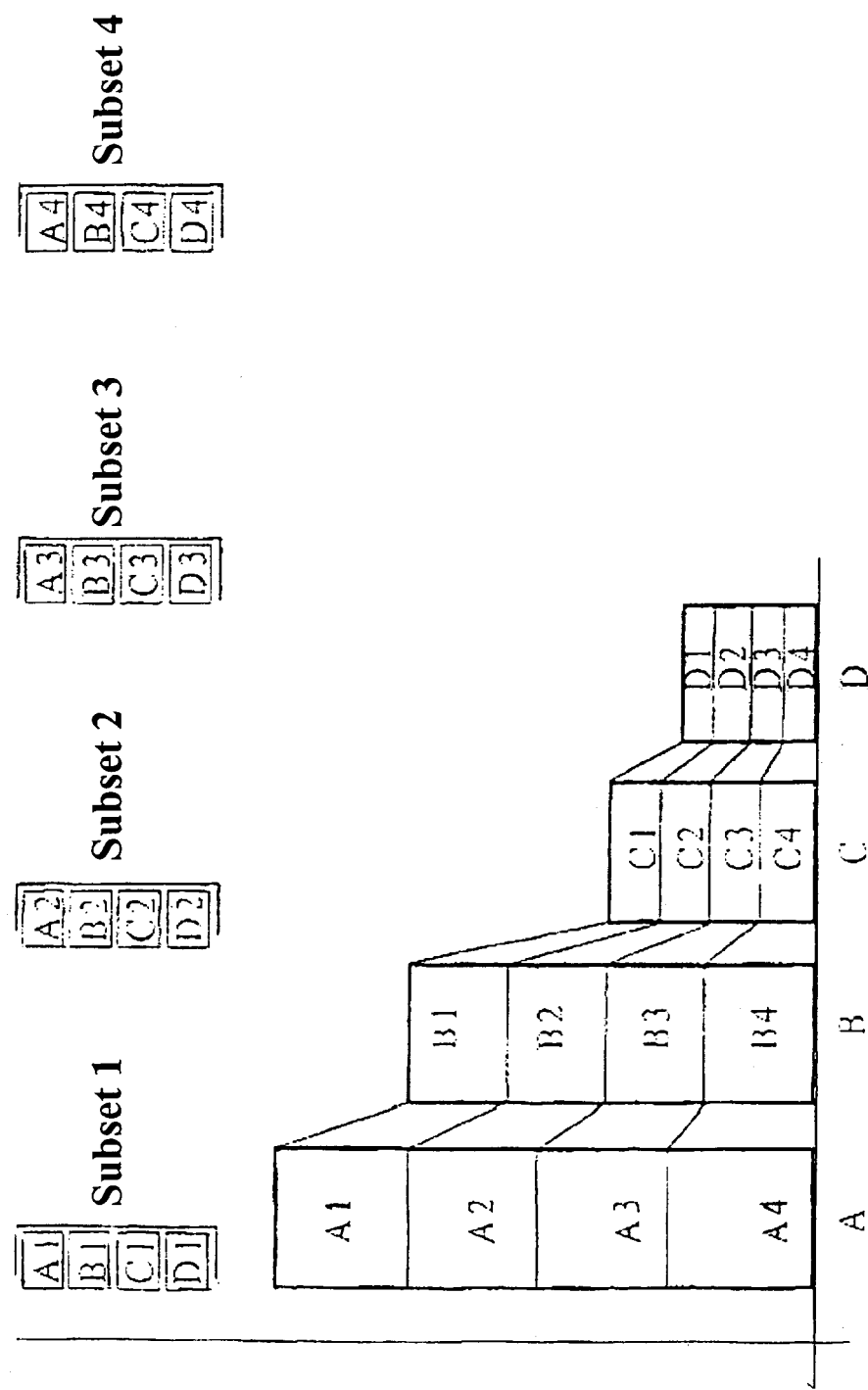
Figure 7C:
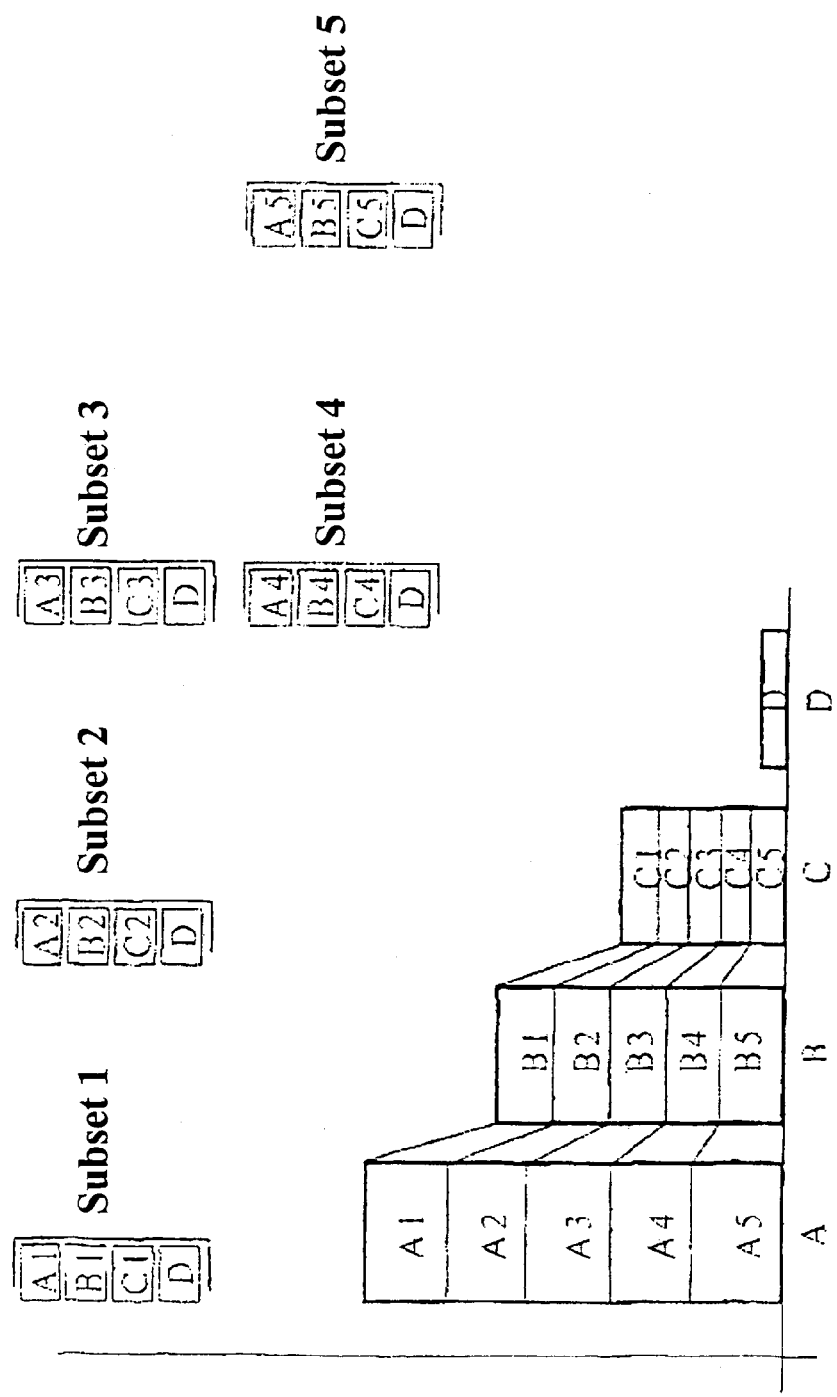

FIGS. 7a, 7b and 7c show three examples of spliting the data list for verifying that the Verification Protocol 214 is used. FIG. 7a shows the spliting of said list into two subassemblies having mutually excluding inputs, so that the partial downloading of results from the Publication Site 106 carried out by the Voter Agent 116 only affects half of the inputs. FIG. 7b shows the spliting of said list into four mutually excluding subassemblies. FIG. 7c shows the existence of an option of excessively minority vote which is not taking into account to carry out the splitting and which is fully included in every and each resulting subassemblies.

DETAILED DESCRIPTION OF THE INVENTION

This invention refers to a secure electronic voting method and the cryptographic scheme used, specially applicable to remote electronic voting through a communication network. Said cryptographic scheme includes cryptographic protocols and processes which take place before, during and after the voting or poll itself. The scope of the invention does not cover the tasks of constructing the roll and the possible management of asymmetric keys for the voters.

Creating a roll of voters is in fact a prior step essential for any poll which seeks to meet the minimum safety requirements. Said roll will be useful during the Vote Casting Protocol 206 and/or the Tallying Process 210, essentially for preventing that non allowed users can vote and that authorized voters record more votes, as well as for preventing the introduction of false ballots or the names of voters who abstained from voting.

Preferably, the voting method will be supported on a public key infrastructure or PKI, a concept disclosed in specification X.509 [ITU-T, *Recommendation X.509* (August 1997) *Information Technology—Open Systems Interconnection—the Directory: Authentication Framework*, 1997], with the aim of managing asymmetric keys for the voting partners. The voter's asymmetric keys are used during the poll for authentication purposes and not for repudiating them. Each voter private key must be known or accessible only by the voter himself. This involves either that the voters generate by their own means their pairs of asymmetric keys or that the pairs of asymmetric keys are generated by a suitable Certifying Authority and are safely delivered to the voters. The private key of each voter can remain at the Polling Station 104 itself, protected by means of a system of symmetric encryption with a password meeting given safety parameters, namely those referring to its entropy. In this case, each voter only ought to know and keep his password. Some representative examples of symmetric encryption which could be used are disclosed in (Applied Cryptography, Protocols, Algorithms and Source Code in C (second edition), Bruce Sneier, editor John Wiley & Sons, Inc., 1996) and (The Design of RijndaeL: AES—The Advanced Encryption Standard (Information Security and Cryptography), Joan Daemen and Vincent Rijmen, Springer Verlag, 2002). The protection of the voter's private keys by means of symmetric encryption prevents that they can be used without knowing the password. This way, the coded private key can be located at the Polling Station 104 with which the voter will interact and be sent to him through the Communication Network 114, at the beginning of the Vote Casting Protocol 206. This technique of storage of the voter's private keys allows preventing the drawbacks arising from installing private keys and digital certificates in the Vote Casting Platforms 102. Alternatively, each voter can keep his private key on a secure physical support (diskette, CD, smart card or another kind of reliable personal key) or coded in his personal computer or in another computing platform he owns forming part of or interconnected with the Votes Casting Platform 102.

Figure 1A:
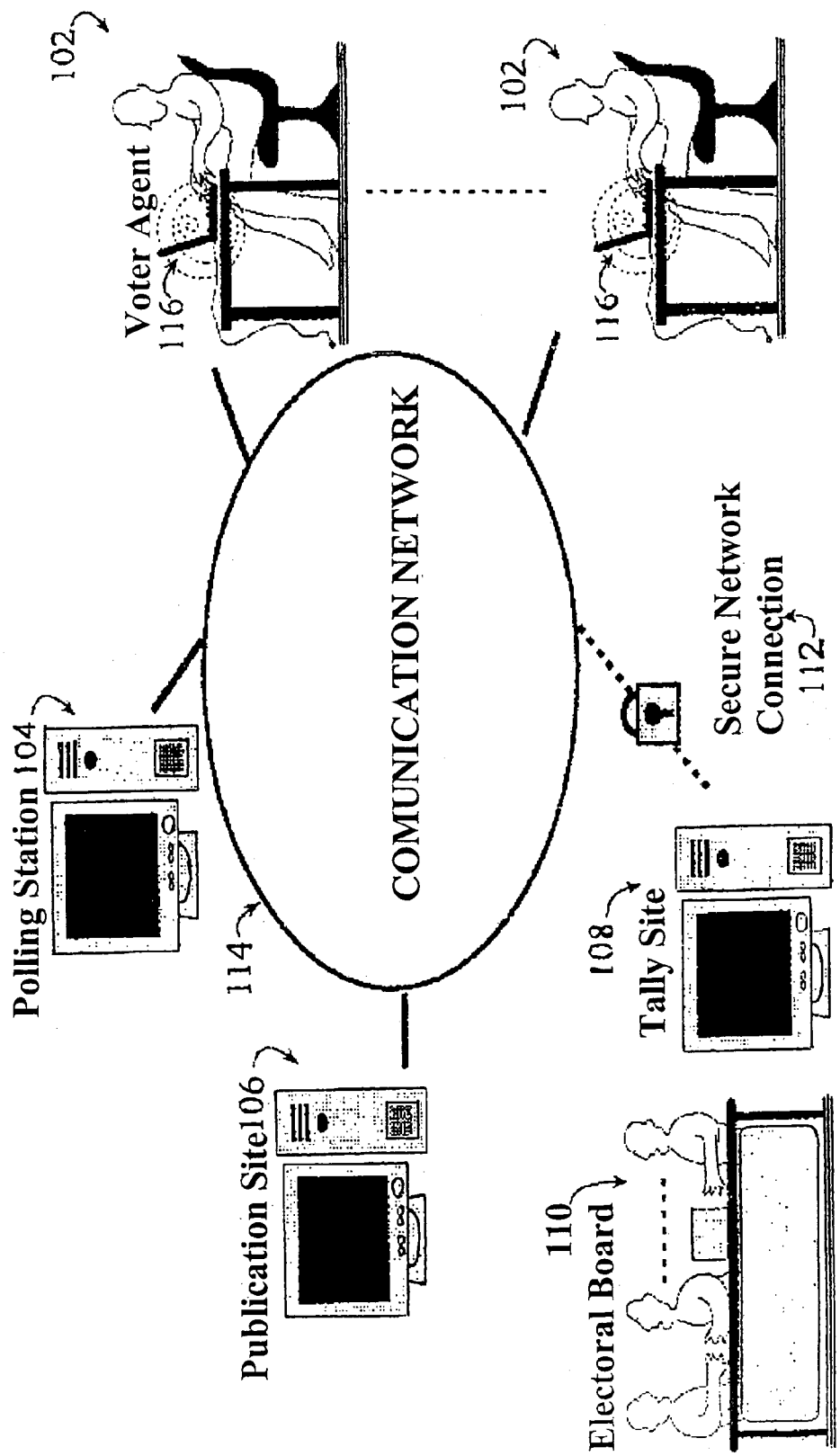
Figure 1B:
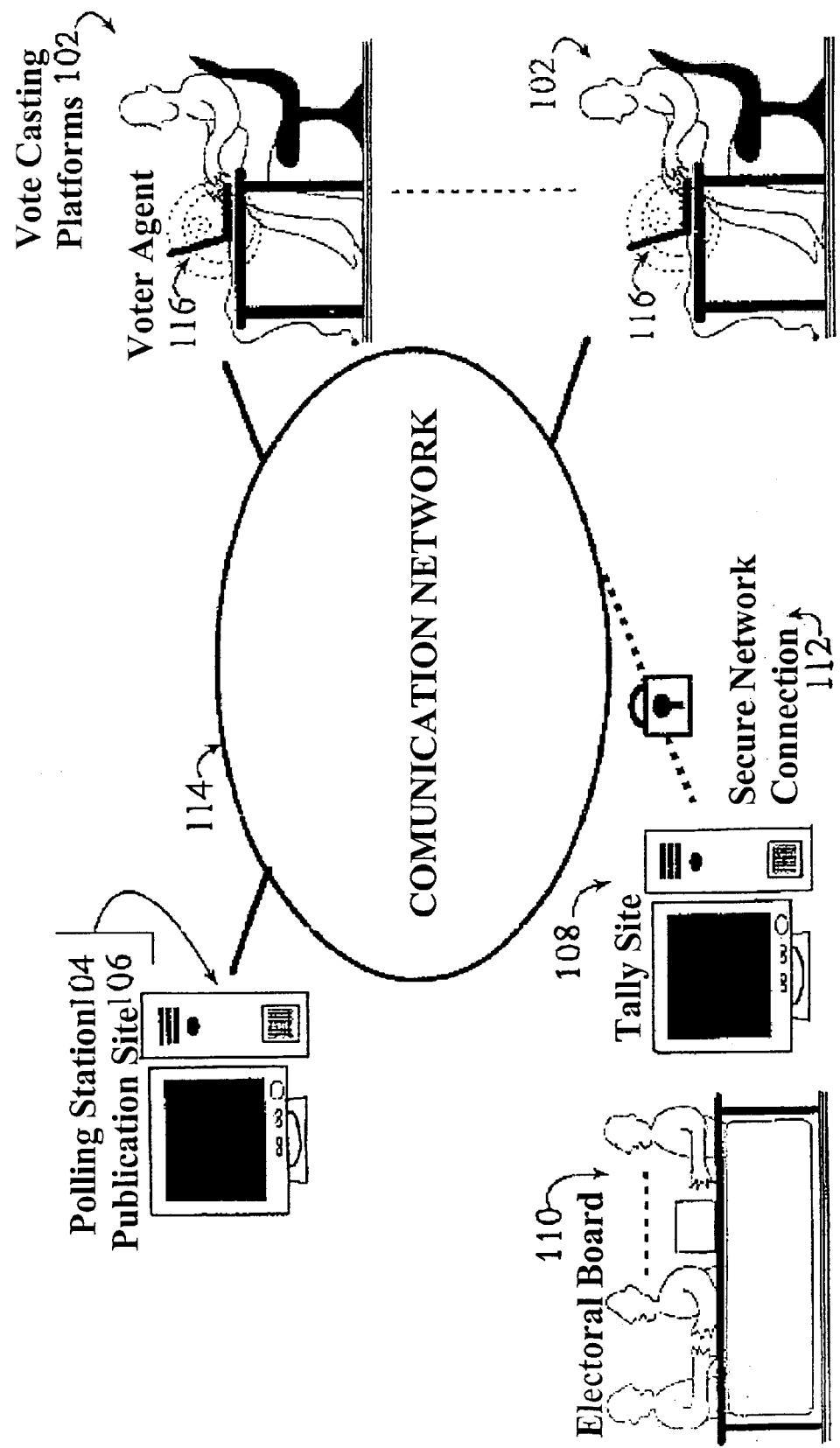
Figure 1:
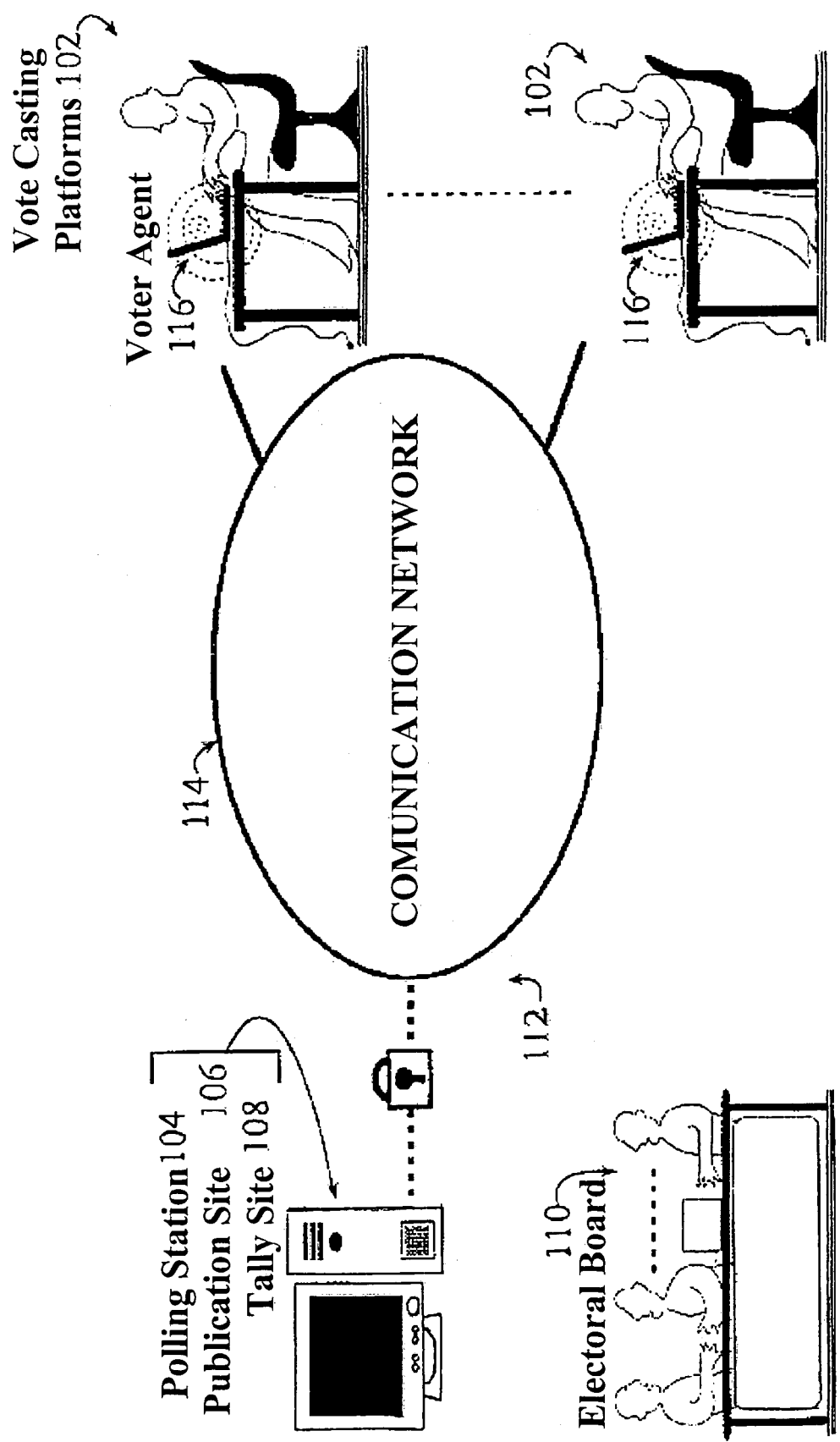
Figure 3:
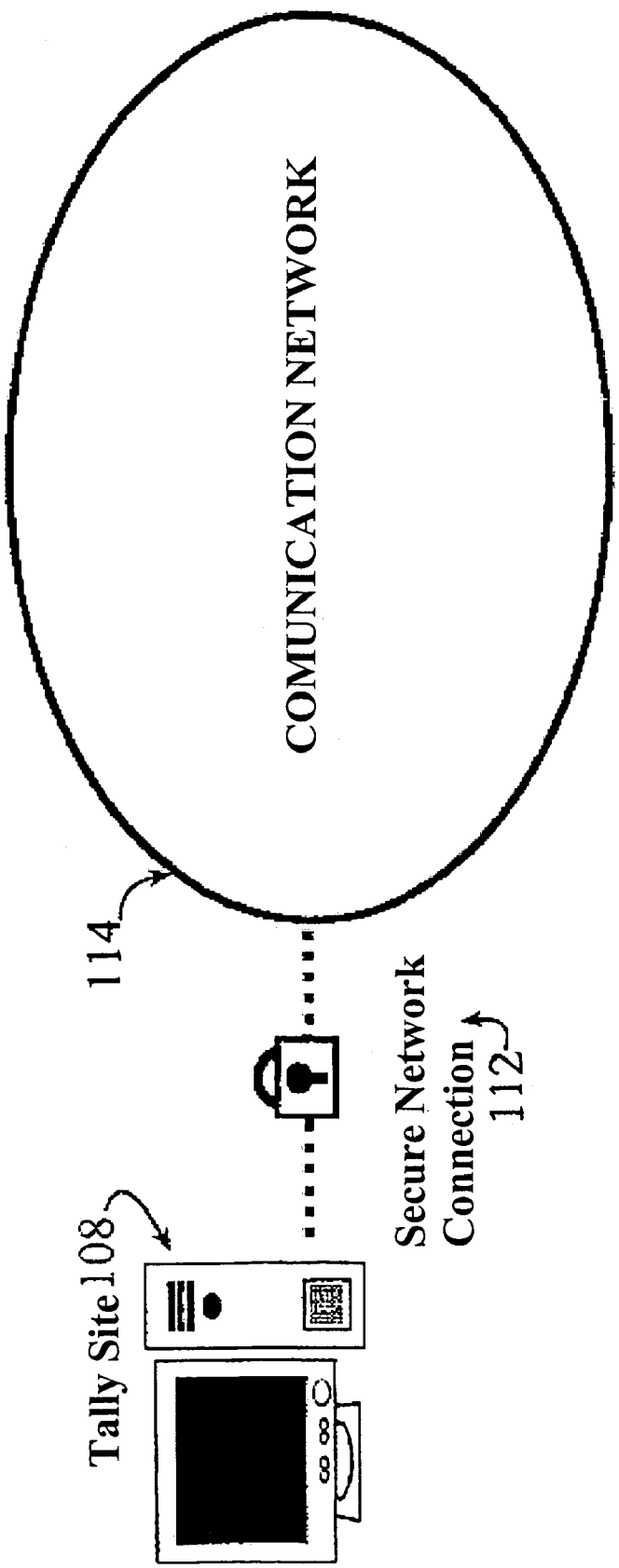
FIGS. 3a and 3b show two possible configurations of the very secure network connection 112 used to connect the Tally Site 108 to the Communication Network 114.
Figure 3:
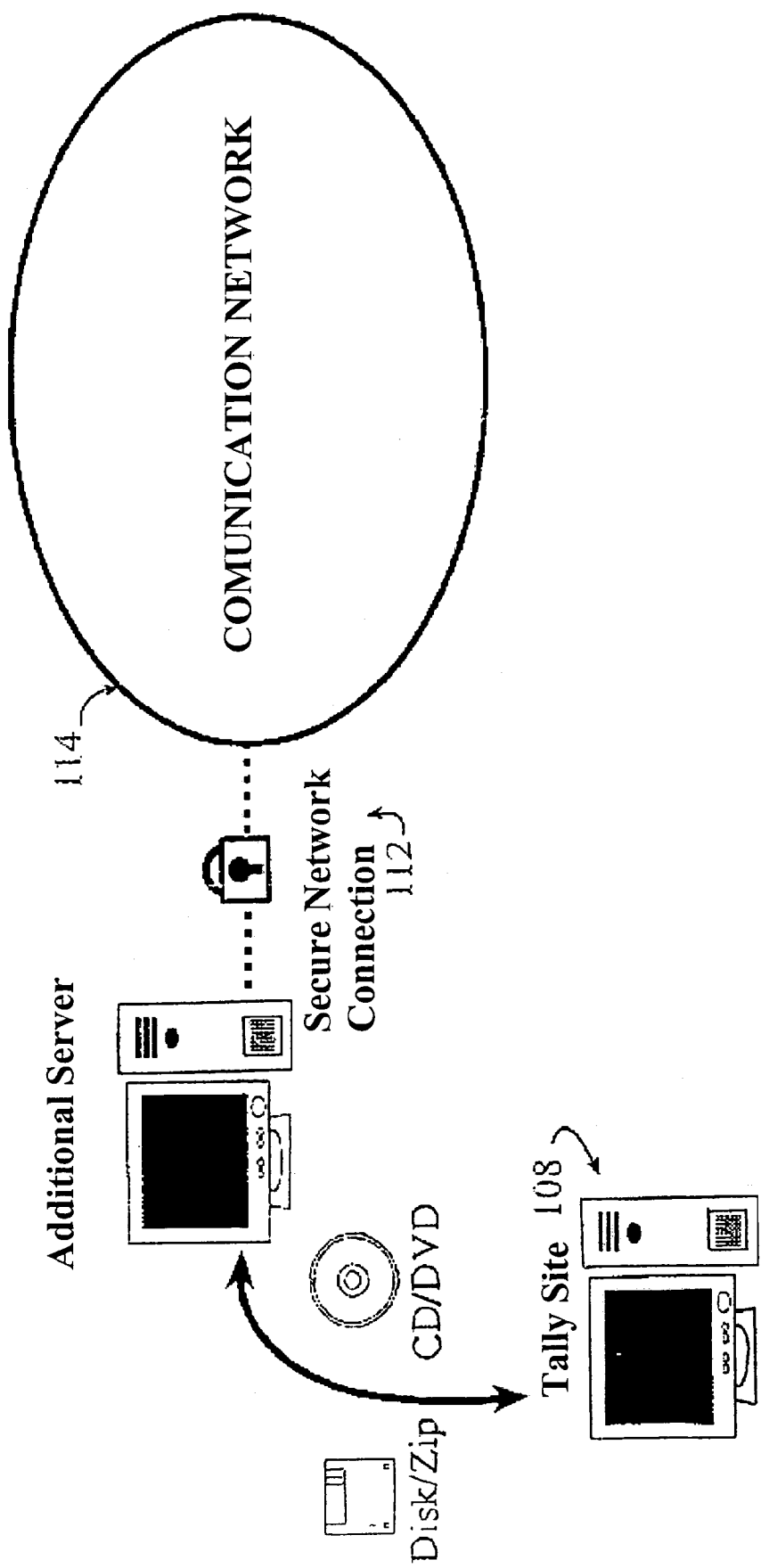

FIG. 1a shows the architecture of the voting system in the event of maximum scattering of the elements composing it. In said figure a plurality of voters can be noted, interacting through their respective Voter Agents 116 in the Vote Casting Platform 102, a Polling Station 104, a results Publication Site 106 and a Tally Site 108, all of them connected through a Communication Network 114, such as Internet. Due to the sensitivity of the Tally Site 108, it is connected to the Communication Network 114 through a high secure network connection 112. An Electoral Board 110 formed by several members controls the reliability of the Tally Site 108, as well as the administrative and functional tasks linked to the electoral process. Opening and closing the Polling Station 104 would be two examples of said tasks. FIGS. 1b and 1c show other possible configurations of the voting system, in which the grouping level of the different elements composing the system is higher. FIGS. 3a and 3b show two possible configurations of the secure network connection 112 used to connect the Tally Site 108 to the Communication Network 114. In FIG. 3a, the connection to the Tally Site 108 to the Communication Network 114 is protected with network computer safety measures, such as above mentioned firewalls, demilitarized areas, etc. This kind of measures significantly hinder the fraudulent remote access which have the aim of attacking the processes and tasks which are being carried out at the Tally Site 108. FIG. 3b shows an even more reliable configuration, with the Tally Site 108 physically disconnected from the Communication Network 114. An additional device connected to the Communication Network 114 is in charge of receiving data that the Tally Site 108 requires to carry out its tasks (basically the digital ballot box). Said data are transferred from the additional device to the Tally Site 108 by means of a physical support such as a magnetic disk, a Zip, CD or DVD. The data which have to flow in the opposite sense also use same kind of support.

The cryptographic processes and protocols included in this invention require from the voter complex mathematical calculations during his interactions with the Polling Station 104 and the Publication Site 106. The complexity of said calculations causes that they are carried out on behalf of the voters by a Voter Agent 116 formed of a set of programs or software. It can be a conventional application, a plug-in for an Internet navigator, an application executed by the navigator himself or a module which is executed in a terminal of a mobile telephony or another computing mobile personal device. The Voter Agent 116 must be duly audited and certified to guarantee the voter that no operation is carried out which is not disclosed in the voting cryptographic processes and protocols. The Voter Agent 116 is executed at the Vote Casting Platforms 102. They can take the form of different hardware or a match of them such as a personal computer, a voting terminal, a personal digital assistant (PDA), a mobile telephony terminal or an smart card.

The Polling Station 104 has the mission of accepting the connections of the Voter Agents 116, collaborate with them in the voting cryptographic processes and protocols and keep the casted votes for counting them thereafter. Optionally, different Polling Station 104 can be created as independent virtual polling stations. This kind of configuration could be given as an example in the case of very large electoral roll requiring distributing the voters in several independent polling stations. In the disclosed below, the existence of a single Polling Station 104 will be assumed (a single virtual polling station) although the method disclosed in this invention could easily be extrapolated to configurations having a plurality of them.

When ending the vote or poll, the Tally Site 108 receives from the Polling Station 104, the digital ballot box containing all the votes casted. Operated by an Electoral Board 110 composed of a plurality of members, the Tally Site 108 enters the votes and draw the list of results. The Tally Site 108 is a component specially sensitive of the voting system. This is why as well hardware as software components constituting it must be kept as simple as possible. Namely, the software must be duly audited and certified to guarantee that no operation is carried out which is not disclosed in the cryptographic voting processes and protocols. As it can be noted in FIG. 3a and 3b, the Tally Site 108 is connected to the Communication Network 114 by means of a high secure network connection 112. The object of said high liability connection 112 is to prevent the non allowed remote access to the Tally Site 108. In a first option, the high reliability connection 112 can be implemented by means of firewalls systems which filter the remote access to the Tally Site 108. In addition, a permanent watching group can monitor with the assistance of intruders detection systems every incidence and anomaly. However, the preferred option to provide the Tally Site 108 with maximum protection with respect to remote access consists in completely insulating it from the Communication Network 114, as shown in FIG. 3b. However, to allow that several data are sent (among them the digital ballot box) to the Tally Site 108 through the Communication Network 114, an additional device is available, physically close to the Tally Site 108 and with connection to the Communication Network 114 (connection protected with the already mentioned safety measures). Said additional device is in charge of receiving the digital ballot box or other data which are thereafter transferred to the Tally Site 108 by means of a suitable physical support or a suitable point to point connection. The information flow in the opposite sense (data to be sent from the Tally Site 108 through the Communication Network 114) also follows a similar operative. It must be pointed out that for a best reliability of the system as a whole firewalls systems for filtering packages at the Polling Station 104 and the Publication Site 106 can also be used.

The Publication Site 106 receives from the Tally Site 108 the voting results once they have been tabulated and it take charge of publishing them through the Communication Network 114. In addition, it allows that the voters can verify the correct recording of their vote or, at least, the correct reception of them by the Electoral Board 110. The Publication Site 106 can consist in one or a plurality of Publication Sites 106 connected to the Communication Network 114.

In the following explanations, it will be assumed that the Polling Station 104, the Tally Site 108 and the Publication Site 106 are located split and well differentiated. However, the possibility of grouping them has already been discussed.

Figure 2:
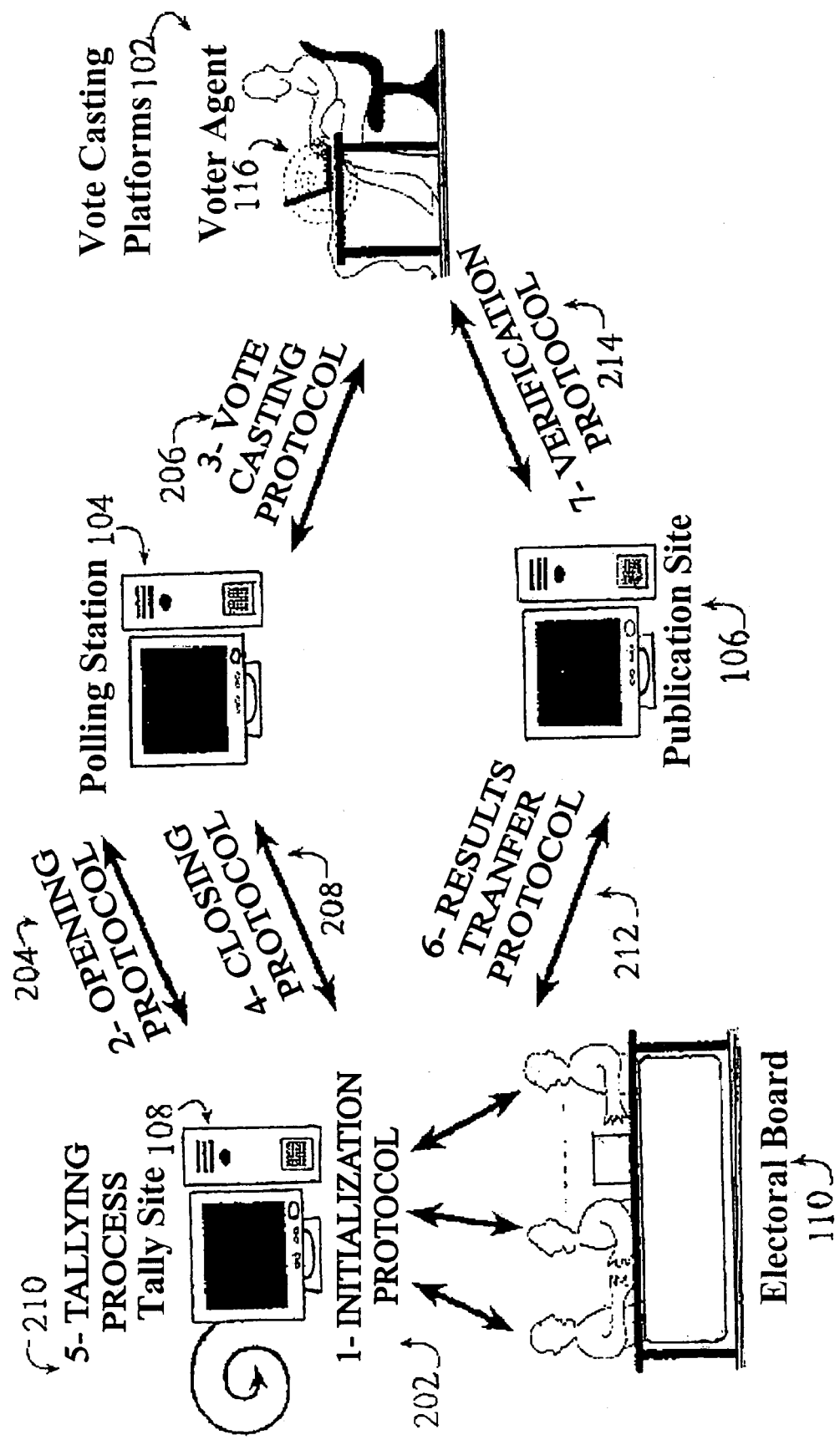
FIG. 2 shows the cryptographic processes and protocols comprised in this invention and the order in which said protocols and processes take place.

The voting system disclosed herein uses a series of cryptographic processes and protocols which are represented in FIG. 2, jointly with the order in which they are being performed along the elections or the poll. Firstly, the Initialization Protocol 202 is executed by the members of the Electoral Board 110. In this protocol, the tasks necessary to prepare voting are carried out. Then, the Opening Protocol 204 of the Polling Station 104 follows. The voters can, from that moment on, execute the Vote Casting Protocol 206, by means of their respective Voter Agents 116 and jointly with the Polling Station 104, in order to cast their votes. When the voting period is complete, Closing Protocol 208 is carried out. The following step consists in the Tallying Process 210, in which the list of results is assessed. When the tallying and tabulation of results is complete, they are transferred from the Tally Site 108 to the Publication Site 106 by means of the Results Transfer Protocol 212. Finally, the voters verify the correct treatment of their votes through the Verification Protocol 214.

To allow a more detailed description of the listed cryptograph processes and protocols, following marking will be used:

V: A specific voter acting from his Vote Casting Platform 102, through his Voter Agent 116.

PS: Polling Station 104.

EB: Electoral Board 110 elect.: Chain of data univocally identifying the elections or polls being held. It can be, for example, a sequential identifier, or the date and a text describing the elections.

ident.: A unique identifier for each vote cast, It can be, for example a chain of random data having a length sufficient with relation to the electoral roll of the voters which are participating in it.

vote: Chain of data identifying in an unique form a given voting option. It is a chain of data which supports arbitrary length and contents. Said characteristic allows a maximum flexibility relative to the format of the ballot papers. For example, open questions can be implemented to which the voter can state an opinion on the subject matter of the question or directly write the identity of the voted candidate.

$M_1|M_2$: Concatenation of two messages $M_1$ and $M_2$.

H{M}: Summary of M message obtained through a cryptographic summary function.

K: Key of a given symmetric encrypted system. Subscripts will be used to distinguish among the different keys of this kind used in the protocols.

$E_K(M)$: Symmetric encryption of M message with K key.

$P_{entity}$ and $S_{entity}$: Pair of asymmetric keys (public key and private key, respectively) owned by the entity.

$P^*_{entity}$ and $S^*_{entity}$: Pair of asymmetric keys (public key and private key, respectively) owned by the entity, corresponding to a probabilistic encryption according to the proposal by Blum and Goldwasser [Blum, M. and Goldwasser, S. *An Efficient Probabilistic Public Key Encryption Scheme which Hides All Partial Information, Advances in Cryptology—CRYPTO '84 Proceedings*, pp. 289-299, Springer Verlag, 1985].

$P_{entity}(M)$: Asymmetric M message encryption with the public key $P_{entity}$.

$P^*_{entity}(M)$: Probabilistic encryption M message with the public key Pentity$_{entity}$.

$E_K(M)|P_{entity}(K)$: Digital envelope of M message designed to entity. Said digital envelope comprises the M encryption with a K symmetric session key, concatenate to the encryption of said K session key with the addressee $P_{entity}$ public key. The mechanism of digital envelope is disclosed in (PKCS#7, *Cryptographic Message Syntax Standard*. A RSA Laboratories Technical Note, Version 1.5, 1 Nov. 1993).

$S_{entity}[H\{M\}]$): Digital signature of M message created with the private key of entity. The signature carries a given cryptographic transformation determined by the private key entity on the summary of the M message obtained by means of a cryptographic summary function. [Rivest, R. L., Shamir, A. and Adleman, L. M. *A Method for Obtaining Digital Signatures and Public Key Cryptosystems*. Comm. of the ACM, V. 21, n. 2, pp. 120-126, 1978] can be taken as a reference of said cryptographic transformation. The format resulting from a digital signature is disclosed in [PKCS#7, *Cryptographic Message Syntax Standard*, A RSA, Laboratories Technical Note, Version 1.5, 1 Nov. 1993].

$M^{BF}$: M message covered by a BF blind factor, according to the proposal of U.S. Pat. No. 4,759,063.

The first step of the voting scheme consists in the Initialization Protocol 202 which comprises the allocation of initial values to all the parameters necessary for the voting in progress and the generation of pairs of asymmetric keys necessary for the Electoral Board 110 as a whole and for the Polling Station 104. Said initialization processes can be carried out during a shorter or longer period of time. In a secure device, two pairs of asymmetric keys are generated for the Electoral Board 110 as a whole. They are called $P_{EB}^{(ADM)}$ and $S_{EB}^{(ADM)}$ the public and private keys, respectively of the first of said pairs and $P_{EB}^{(ENV)}$ and $S_{EB}^{(ENV)}$ the keys of the second pair. Also, a pair of keys is generated for the Polling Station 104, called $P_{PS}$ and $S_{PS}$. The public keys must be certified. Said certification can be achieved by a Certifying Authority having a wide representation among Internet conventional navigators. Alternatively, the public keys could also be certified by a Certifying Authority of the Public Key Infrastructure (PKI) associated to the voting system or another Certifying Authority of some PKI the root public key of which is in some way acknowledged by the voters.

Keys $P_{PS}$ and $S_{PS}$ are going to be used by the Polling Station 104 for performing the digital signatures during the Vote Casting Protocol 206 and the Closing Protocol 208. Namely, the private key $S_{PS}$ will be used very often during the Vote Casting Protocol 206 and therefore, it will preferably installed in a hardware device such as, for example, a cryptographic accelerating card which will be associated to the Polling Stations 104. If said hardware is not available, the private key will be protected by means of conventional protecting mechanisms offered by the file system of the Polling Stations 104.

Keys $P_{EB}^{(ADM)}$ and $S_{EB}^{(ADM)}$ are going to be used by the Electoral Board 110 for the Opening 204 and Closing Protocols 208 of the Polling Station 104, optionally for the Vote Casting Protocol 206 as well as for all those operations which require that a digital signature is performed by the Electoral Board 110. The private key $S_{EB}^{(ADM)}$ will stay at the Tally Site 108 which will be connected to the Communication Network 114 by means of the High Reliability connection 112.

Keys $P_{EB}^{(ENV)}$ and $S_{EB}^{(ENV)}$ will be used only for the voting in progress. With the public key $P_{EB}^{(ENV)}$ of the Electoral Board 110, the voters will protect their votes during the Vote Casting Protocol 206. The private key $S_{EB}^{(ENV)}$ of the Electoral Board 110 is a piece of information having a great sensitivity because with it the votes can become unprotected to allow their recount. The knowledge of said key by a single voting authority would weaken the electronic voting for concentrating too much confidence at a single point. The person who would know said private key could sustain pressures or simply be dishonest and try to manipulate the poll. To prevent that an excess of confidence is concentrated, a cryptographic mechanism is used for sharing the confidence between the different members constituting the Electoral Board 110. Said mechanism remove the possibility that a single member of the Electoral Board 110 or a given minority of them are acquainted with the private key $S_{EB}^{(ENV)}$. In general, it is assumed that no majority coalitions having dishonest aims will occur between the members of the Electoral Board 110, because each of its members may have conflicting interests as they represent different voting options, they pertain to third parties having interests in that the elections are correctly performed or simply be an independent auditor. However, even in the case that a majority coalition having dishonest aim occurs, this invention allows, if applicable, that the voters themselves are capable of detecting the manipulation of the digital ballot box (suppressing or modifying the votes cast as well as adding false ballots).

Different cryptographic protocols for sharing secrets can be used in this invention to split the private key $S_{EB}^{(ENV)}$ of the Electoral Board 110 between its members, meeting the mentioned characteristics of confidence sharing. In the cited work by Schneier a description of them can be found.

When the private key $S_{EB}^{(ENV)}$ of the Electoral Board 110 has been split into individual portions trough a cryptographic protocol for sharing secrets, each of the portions is stored, conveniently encrypted, at the Tally Site 108 used for performing said splitting. To encrypt the portions, a suitable encryption system (typically symmetric) is used as well as a secure random key generated by the Tally Site 108 itself and different for each of the portions. One of the portions is allocated to each member of the Electoral Board 110 so that he receives the random key used for encrypting said portion (generated with or without his intervention). The key received is stored in a secure memory personal device. The original private key, as well as the non coded portions are finally destroyed erasing any trace of them from the processing, storing and memory devices and systems of the Tally Site 108. Alternatively, the members of the Electoral Board 110 could have directly received their respective portions so said portions would not be stored encrypted at the Tally Site 108 but in the secure memory personal devices.

The following step after the Initialization Protocol 202 is the Opening Protocol 204 of the Polling Station 104. The Electoral Board 110 is the one which determines the moment for opening the Polling Station 104. For that, the opening order 402 (See FIG. 4) is released to the Polling Station 104. Said opening order 402 must contain following fields. First, the identifier of the elections in progress elect. Second, the identifier of the Polling Station 104 (typically the Internet IP address of the Polling Station 104 to which the voters have access, or its domain name DNS). Third, the state of the Polling Station 104 ("OPEN"). Fourth, the probability rate $PR_{ACK}$. Said rate regulates the process of issuing voting confirmations from the Voter Agents 116 to the Tally Site 108. This process is carried out at the end of the Vote Casting Protocol 206 as it will be disclosed later on. Optionally, the opening order 402 can also contain the opening date and time. Lastly, said order must incorporate an authenticity evidence that it has been generated by the Electoral Board 110. Said evidence consists in the digital signature of the opening order 402, using $S_{EB}^{(ADM)}$. The generic form of the opening order 402 would be then:

elect|PS|"Open"|$PR_{ACK}$|$S_{EB}^{(ADM)}$
[H{elect|PS|"Open"|$PR_{ACK}$}]

When the opening order 402 has been received by the Polling Station 104, the voters can start casting their votes. When the Vote Casting Protocol 206 is complete, the vote cast by each voter will be stored at the Polling Station 104,duly protected with cryptographic means which will be disclosed below. Also, the Vote Casting Platform 102 will store a voting receipt with the aim of verifying thereafter the vote.

Figure 5:
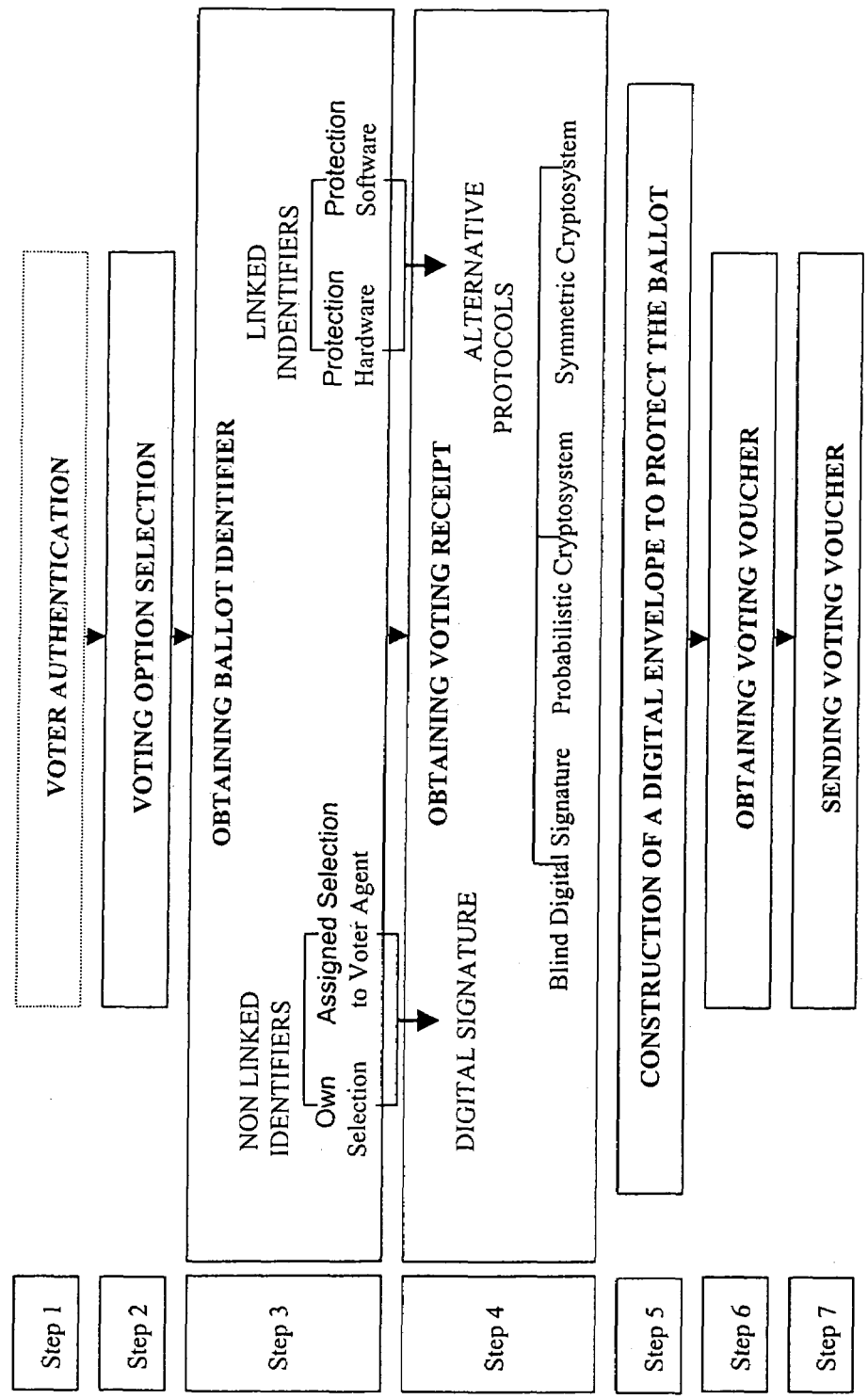
FIG. 5 shows the seven steps constituting the Vote Casting Protocol 206.

The Vote Casting Protocol 206 comprises seven steps, as detailed in FIG. 5. If the Vote Casting Platform 102 consists in a reliable personal device and has available a secure tamper-proof module, all the cryptographic operations that the Voter Agent 116 performs in the Vote Casting Protocol 206 (and also in the Verification Protocol 214) are carried out within it for a best security.

The first step of the Vote Casting Protocol 206 is optional and contemplates the voter authentication downstream the Polling Station 104. In the second step, the voter selects his voting option from the different options provided. In the third step, the Voter Agent 116 obtains a ballot identifier, unique for each ballot. Said identifier can be known (and even selected) by the voter in the configuration with non linked identifiers. The ballot identifier cannot be known by the voter in the configuration with linked identifiers. In the fourth step, the Voter Agent 116 obtains a voting receipt which validates the ballot and which will allow the verifiability of the results of the vote. The voting method allows two different levels of verifiability, depending on its configuration (linked or non linked identifiers). In the fifth step, the Voter Agent 116 protects the ballot and remaining related information by constructing a digital envelope which can only be open by a set of qualified members of the Electoral Board 110. In the sixth step, after the Polling Station 104 received the digital envelope from the preceding step, it delivers to the Voter Agent 116 a voting voucher evidencing that the vote was actually delivered. In the seventh step, the Voter Agent 116 decides to totally or partly send said voucher to the Tally Site 108, according to the probability $PR_{ACK}$ specified in the opening order 402, as a confirmation of correct finalization of the Vote Casting Protocol 206. The Vote Casting Protocol 206 always requires the voter authentication. Said authentication can be carried out in the first step of said protocol or by using a proof of authenticity in the fifth.

In the first step of the Vote Casting Protocol 206, the voter authentication allows the Polling Station 104 to obtain with a reasonable reliability a proof of the true identity of each voter which is remotely contacting. Ideally, the voters should have available a pair of asymmetric keys allowing them to perform strong authentication protocols, such as for example those disclosed in standard X.509 above mentioned or by means of the industry standards WTLS [WAP Forum, *Wireless Transport Layer Security Specification,* Version 06 April 2001, April 2001], TLS [Dierks, T. and Allen, C. *The TLS protocol,* version 1.0 Request for Comments 2246, January 1999] or his predecessor SSL [Freier, A. O., Karlton, P. and Kocher, P. C. *The SSL protocol,* version 3.0. Internet-Draft, November 1996], with bilateral authentication. The use of biometric identification systems could be matched with the strong authentication mechanism to add more reliability to the voter's remote authentication. This first step of the Vote Casting Protocol 206 is optional and in the event that it is not performed, the vote authenticity evidence to be achieved in the fifth step of the Vote Casting Protocol 206 will offer due guaranties on each voter identity.

On its hand, the Polling Station 104 must also be authenticated to the voters using for it the industry standard authentication protocols, mentioned in above paragraph. Said protocols, in addition, guarantees the secure transport of data (the secrecy, reliability and authenticity of the data exchanged between the Vote Casting Platform 102 and the Polling Station 104).

During the second step of the Vote Casting Protocol 206, the voter, interacting with the Voter Agent 116 at the Vote Casting Platform 102 selects the sense of his vote. This invention allows the maximum flexibility with respect to the format of the ballots. The voter can state selecting a given option, a set of them or for some and against some others. Open questions can also be posed to collect the opinion of the voter in a free format, or allow also electing the selected candidates at the very moment of casting the vote. The voter choice is coded in the chain of vote data which admits any format either standardized or not.

The third step of the Vote Casting Protocol 206 consists in obtaining a unique identifier for the ballot. Said value (ident) must be sufficiently high to allow to univocally identifying each of the vote cast. The obtaining of ident can be achieved by two different ways, depending on how the voting method is configured. A first configuration allows the voter to choose the ident value within a predetermined range or to delegate to his Voter Agent 116 the election of said value. A second configuration requires that the voter is not capable of determining the unique identifier of his ballot beforehand, nor to know it after it has been obtained. In this case, the ident value is obtained by the Voter Agent 116 at random with an even distribution.

In the first mentioned configuration, the ballot identifiers appear published in the final results, without any link with the respective voting options (which will be published grouped as totals). This first configuration will allow the voters during the Verification Protocol 214, to make sure of the correct receipt of their ballots by the Electoral Board 110. Said configuration will be designated as "configuration with non linked ballot identifiers". In the second configuration, "with linked ballot identifiers", the final results incorporate a list of all the vote cast, individually and accompanied with their respective ballot identifiers to facilitate their location and identification. This second configuration will allow the voters to make sure not only the correct receipt of their ballots, but also of their correct recording by the Electoral Board 110. In both cases, this invention secures the impossibility of coercion or sale of the votes based on the use and knowledge of the ballot identifiers.

In the configuration with non linked ballot identifiers, the voter has no means available to evidence the link between his ballot identifier and the voting option chosed. For this reason, the coercion or sale of votes based on the search from the results published of the ballot identifier has no effect.

However, in the configuration with linked ballot identifiers, the coercion or sale of votes could be based on the capacity of the voter to predetermine, or only be acquainted with the identifier of his ballot. This would mean a significant weakness because the coercion and the sale of votes would be no longer a confined problem but would become a significant threat to the reliability of the elections as a whole. In fact, the difference has to be set between the coercion or the individual sale of votes, because the fact to remotely voting from uncontrolled environments and the mass coercion or sale of votes based on the automated processing of the ballot identifiers or the voting receipts. By simply the voters being acquainted with the ballot identifiers before their publication in the final results this would mean an unequivocal evidence of the voting option chosen by each voter. This way, it would not be required to observe the voter while he is casting his vote but it would be enough to verify which actually the vote cast was when tallying its ballot identifier with the list of votes published.

Therefore, in the configuration with linked ballot identifiers, the Voter Agent 116 must prevent the access of the voter to his ballot identifier, as well during its generation as when it is stored thereafter, Ideally, said control of access is carried out incorporating to the Vote Casting Platforms 102 some kind of hardware tamper-proof device such as a smart card. The ident value is generated within said device, stored in a protected memory area which prevents the access even to the voter himself. A first version of said concealing technique for sensitive data for the voters was introduced in [Riera, A. Borrell, J. and Rifá, J. *An incoercible verifiable electronic voting protocol.* Proc. of the IFIP SEC '98 Conference, pp. 206-215, Austrian Computer Society, 1998]. Alternatively, said data concealment can be achieved by means of software protection. However, this kind of protection is too weak in front of given attacks. That is why the preferred implementation is based on the use of a hardware tamper-proof device. Even though, in the event of using software protection for concealing the ballot identifier, this invention includes a cryptographic protocol between the Voter Agent 116 and the Polling Station 104 to obtain the ballot identifier. The protocol proposed allows the joint generation of the ballot identifier so that the voter can in no way predetermine beforehand the identifier, while it prevents the Polling Station 104 to obtain any knowledge about the identifier after they have been jointly generated. Before starting the protocol, the Voter Agent 116 and the Polling Station 104 must agree the use of a given symmetric encryption system. The size of the encryption device block must coincide or be higher than the size of the ballots identifier to be generated (in the event it is lower, the protocol must be repeated as many times as required). The Voter Agent 116 generates at random a $K_i$ key for the encryption system selected and, by means of a cryptographic summary function, it calculates the summary chain of said key, $H\{K_i\}$. The Voter Agent 116 sends said summary to the Polling Station 104. At the Polling Station 104, a random value R is generated having a number of bits equal to the size of the agreed encryption device block. The Polling Station 104 can digitally sign the summary of the symmetric key it received jointly with the R value it generated. Said digital signature will be useful for verifying, at the Tally Site 108 the consistency of the ballot identifier which is obtained, preventing the falsification of said identifiers by the dishonest voters. In the following step of the protocol, the Polling Station 104 sends then to the Voter Agent 116 following data:

$$H\{K_i\}|R|S_{PS}[H\{H\{K_i\}|R\}]$$

To obtain the ident value, the Voter Agent 116 encrypt with the $K_i$ key the R value send by the Polling Station 104, obtaining ident=$E_{K_i}[R]$.

The fourth step of the Vote Casting Protocol 206 consists in obtaining a voting receipt. In the configuration with non linked ballot identifiers, said voting receipt grants validity to the ballot identifier selected at the third step, and allows that the voter publicly files a claim in the event that said ballot identifier is not published in the final results. In the configuration with linked ballot identifiers, said voting receipt grants validity to the voting option selected at the second step, linking it to the ballot identifier obtained at the third step. This allows that the voter publicly files a claim in the event that said ballot identifier to which it is linked is not published in the final results. In both cases, the claim can be publicly filed proving the recording problem and without disclosing which was the voting option.

In the configuration of non linked ballot identifiers, the voting receipt is obtained by means of the digital signature of the Polling Station 104 from the concatenating of the ballot identifier and the elect identifier:

$$ident|elect|S_{PS}[H\{ident|elect\}]$$

In the configuration with linked ballots identifiers, the voting receipt must contain information somewhat closely linked to the voting option selected by the voter, ballot. This way, further manipulation of the voting option is prevented, keeping valid same voting receipt. The voting receipt however cannot contain non coded the ballot value because this would prevent the voter from publicly filing a claim (the voter, when he shows his validated voting receipt, would disclose which was actually his voting option). The technique of the voting tags introduced in [Sako, K. *Electronic voting scheme allowing open objection to the tally*, IEICE Tras. Fund. Of Electronics, Communication in Computer Science, E77-A, pp. 24-30, 1994] and improved in its practical implementation aspects in [Riera, A. Rifá, J. and Borrell, J. *Efficient construction of vote-tags to allow open objection to the tally in electronic elections.* Information Processing Letters, Vol. 75, n.4, pp. 211-215, Elsevier Science, October 2000] assists to achieve the objectives to be met by the voting receipts. In this invention, a voting receipt for the configuration with linked identifiers is constructed applying a cryptographic summary function on the voter voting option, vote, and the ballot identifier ident, and concatenating each summary chain with the identifier of the elections in progress, elect, finally obtaining H{ident|vote}| elect. To provide validation to said voting receipt, the Polling Station 104 will use its private key $S_{PS}$. However, the use of the digital signature conventional mechanism would allow that the administrators of the Polling Station 104 (or who has analogous privileges) to correlate the votes published in the results with the voting receipts previously validated during the Vote Casting Protocols 206. To prevent said drawback, which would directly impair the voter's privacy, this invention uses variations of the digital signature mechanism. Said variations allow providing validity to the voting receipt and at same time it prevents at the Polling Station 104 to correlate the validated receipts and the votes which will be published later in the results.

The first variation of the digital signature mechanism which can be used in this invention consists in the so-called blind digital signature, disclosed in U.S. Pat. No. 4,759,063. This way, the Voter Agent 116 prepares the data to be signed with a blind factor BF generated at random $(H\{H\{ident|vote\}|elect\})^{BF}$ and sends said data to the Polling Station 104. The Polling Station 104 digitally signs the information received with its private key, obtaining $S_{PS}[(H\{H\{ident|vote\}|elect\})^{BF}]$ and sends said signature to the Voter Agent 116. Due to the random nature of the blind factor, the Polling Station 104 obtains no useful information about the voting receipt. The Voter Agent 116, however, is capable of erasing the blind factor from the signature he receives, recovering the digital signature on the original voting receipt, which constitutes the validated voting receipt:

$$H\{ident|vote\}|elect|S_{PS}[H\{H\{ident|vote\}|elect\}]$$

A second variation for validating the voting receipts consists in encrypting them by means of a probabilistic cryptosystem, before transferring them to the Polling Station 104. The probabilistic encryption has the property that a same message encrypted several times with a same public key gives rise to different encrypted texts so that the Polling Station 104 cannot relate the encrypted receipts it validated to the votes which are published in the results. The concept of probabilistic encryption was disclosed in [Goldwasser, S. and Micali, S. *Probabilistic encryption*, Journal of Computer and System Sciences, Vol. 28, n° 2, April 1984], and later on, a possible implementation was disclosed in [Blum, M. and Goldwasser, S., *An Efficient Probabilistic Public Key Encryption Scheme which Hides All Partial Information*, Advances in Cryptology—CRYPTO '84 Proceedings, pp. 289-299, Springer Verlag, 1985]. The steps for validating the voting receipts using probabilistic encryption are as follows. First, the Voter Agent 116 generates a pair of session keys for the probabilistic cryptosystem, $P^*_{SESSION}$ and $S^*_{SESSION}$ (public key and private key, respectively) and probabilistically encrypts the receipt with the public key:

$$P^*_{SESSION}(H\{ident|vote\}|elect)$$

Then the Voter Agent 116 transmits to the Polling Station 104 the encrypted receipt jointly with the recently generated public key, $P^*_{SESSION}$. The Polling Station 104 digitally signs this information with its private key, transmitting said signature to the Voter Agent 116. The Voter Agent 116 stores the signature received jointly with the key $S^*_{SESSION}$, forming all of it the validated voting receipt:

$$P^*_{SESSION}(H\{ident|vote\}|elect)|P^*_{SESSION}|S_{PS}\\ [H\{P^*_{SESSION}(H\{ident|vote\}|elect)|P^*_{SESSION}\}]\\ \|S^*_{SESSION}$$

A third variation for validating the voting receipts consists in using symmetric encryption for concealing the receipt downstream the Polling Station 104. To obtain the validation of his voting receipt, the Voter Agent 116 generates at random a $K_r$ session symmetric key. The Voter Agent 116 encrypts the voting receipt with the key generated and sends to the Polling Station 104 said encryption jointly with the summary of $K_r$ key, obtained by means of a cryptographic summary function:

$$E_{K_r}[H\{ident|vote\}|elect]|H\{K_r\}$$

The Polling Station 104 digitally signs the message receipt with its private key, sending said signature to the Voter Agent 116. The Voter Agent 116 stores the signature received with the $K_r$ key, all of it forming the validated voting receipt:

$$E_{K_r}[H\{ident|vote\}|elect]|H\{K_r\}\|S_{PS}[H\{E_{K_r}\\ [H\{ident|vote\}|elect]|H\{K_r\}\}]|K_r$$

Once the Voter Agent 116 has available the voting receipt validated by the Polling Station 104 (according to any of the disclosed alternatives) he can proceed with the fifth step of the Vote Casting Protocol 206. This step comprises the construction of a digital envelope to protect the ballot (and therefore the voter privacy). Only the Electoral Board 110 as a whole will be able to open said digital envelope, following this way an analogy with most of the conventional electoral systems. In the digital envelope, the Voter Agent 116 includes the vote chain, the ballot identifier ident and the validated voting receipt, as well as the information necessary to verify the correct obtaining of the ident in the event that said value has been generated jointly by the Voter Agent 116 and the Polling Station 104. In addition, the digital envelope will contain all the information relevant for correctly administering the elections such as the kind of ballot, the date when the elections have to be held or the identifier of the language used. To construct said digital envelope, the Voter Agent 116 generates a session key $K_e$ it encrypts it with the public key $P_{EB}^{(ENV)}$ of the Electoral Board 110. The digital envelope generic form would be then:

$$\text{envelope}=E_{K_e}[\text{vote}|\text{ident}|\text{voting receipt}|\text{relevant information}]|P_{EB}^{(ENV)}[K_e]$$

After encrypting the contents of the envelope, the Voter Agent 116 attaches a proof of authenticity to said digital envelope. In this invention, four different options are contemplated to guarantee the authenticity of said digital envelope. In a first option, the Voter Agent 116 concatenates the digital envelope with the identity of the voter V, with the identifier of the elections elect, with the opening order 402 and optionally, with a mark of time (time) corresponding to the moment when the vote was issued and which is agreed upon between the Voter Agent 116 and the Polling Station 104. The set of all those concatenated data is digitally signed with the private key $S_v$ of the voter and is transmitted to the Polling Station 104:

envelope|V|elect|Order 402|time|$S_V$
[H{envelope|V|elect|Order 402|time}]

In a second option, the Voter Agent 116 concatenates the same previous data except the digital envelope, and digitally signs them with the private key $S_v$ of the voter.

V|elect|Order 402|time|$S_v$[H{V|elect|Order 402|time}]

Then the Voter Agent 116 prepares a second digital envelope envelope' which he sends to the Polling Station 106. To construct an envelope, he uses the public key $P_{EB}^{(ADM)}$ of the Electoral Board 110. This second digital envelope contains the first digital envelope and the digital signature on the specified values:

envelop'=$E_{Ke'}$[envelop|V|elect|Order 402|time|Sv
[H{V|elect|Order 402|time}]]|$P_{EB}^{(ADM)}$[Ke']

The third option is indicated for elections in which the voters have no available a pair of asymmetric keys. In this kind of elections, each voter must have available a private voter identifier (PVI) different and secret which allows him to be authenticated. The Voter Agent 116 concatenates said piece of information, PVI, with the identity of the voter V, and with the identifier of the elections, elect, with the Opening Order 402 and optionally with a mark of time (time) and it constructs a second digital envelope, envelope', with the public key $P_{EB}^{(ADM)}$ of the Electoral Board 110:

envelope'=$E_{Ke'}$[envelope|PVI|V|elect|Order 402|time|]
|$P_{EB}^{(ADM)}$[Ke']

In a fourth option, the Voter Agent 116, based on an asymmetric cryptosystem selected, creates a pair of keys ($P_V^{(AUT)}$, $S_v^{(AUT)}$) where the public component or one of the components of the public key, is the summary of the digital envelope, envelope obtained by means of a cryptographic summary function. For example, using the public key cryptosystem RSA [Rivest, R. L. Shamir, A. Y. Adleman, L. M. *A method for obtaining digital signatures and public-key cryptosystems.* Communications of the ACM, v. 21, n. 2, pp. 120-126, February 1978], the public component, which usually receives the name of e, would correspond to the summary of the digital envelope, and the private component d, would be calculated, conventionally, in order it meets the properties of said cryptosystem. With the private component of the pair of keys created, the Voter Agent 116 obtains following signature:

V|elect|Order 402|time|$S_V^{(AUT)}$[H{V|elect|Order
402|time}]

The Voter Agent 116 concatenates and sends to the Polling Station 104 the following information:

envelope|V|elect|Order 402|time|$S_V^{(AUT)}$
[H{V|elect|Order 402|time}]

In the second and third options, in contrast with the first and fourth, it is not possible to deduct the identities of the voters who voted from the ballot box at the Polling Station 104. Anyway, the proof of authenticity included with the digital envelope which contains the ballot prevents to add ballots in the name of voters who abstained to vote as well at the Polling Station 104 as at the Tally Site 108.

The sixth step of the Vote Casting Protocol 206 consists in obtaining a voting voucher. Said voucher, issued and validated by the Polling Station 104 by means of a digital signature, has the aim of thereafter allowing the voter to evidence that he finally deposited at the Polling Station 104 a digital envelope during the voting in progress. The voting voucher can then consist in the signature of the Polling Station 104 on the data delivered by the voter at the preceding step. For the first and fourth options disclosed above:

envelope|V|elect|Order 402|time|$S_{PS}$
[H{envelope|V|elect|Order 402|time}]

For the second and the third options:

envelope'|$S_{PS}$[H{envelope'}]

The Polling Station 104 deposits in the digital ballot box the set of data delivered by the voter at the fifth step of the protocol, jointly with the voting voucher. This way, each ballot in the digital ballot box incorporates a proof of the authenticity from the voter himself and a proof of authenticity from the Polling Station 104.

The Voter Agent 116 stores the voting voucher obtained in the sixth step of the Vote Casting Protocol 206. Said voucher will be required in the processes of filing a claim against the recount, to evidence that the voter actually casted his vote.

The seventh and last step of the Vote Casting Protocol 206 consists in the Voter Agent 116 sending to the Tally Site 108, of the chain of data corresponding to the digital signature included in the voting voucher obtained at the sixth step of the Vote Casting Protocol 206 $S_{SP}$[H{envelope|V|elect|Order 402|time}]. This sending is not carried out in a deterministic way but the Voter Agent 116 sends according to the probability $PR_{ACK}$ included in the opening order 402. The objective of sending it is to be able to statistically detect the eventual erasure of the digital envelopes at the Polling Station 104 with a level of confidence as high as wished without overloading in excess the Tally Site 108.

The Vote Casting Protocol 206 could be stopped due to causes beyond the voting method (failures in the Communication Network 114, for example). In the event that some of that unforeseeable events occurs, an agency for the survey of the elections in charge of overcoming said situations and attending the voters must exist. The specification and operation of said agency remains out of the scope of this invention.

In FIG. 2 it can be seen how the step following the Vote Casting Protocol 206 is the Closing Protocol 208 of the Polling Station 104, which stops accepting new connections from Voter Agents 116. The Closing Protocol 208 is started by the Electoral Board 110 which sends to the Polling Station 104 the closing order 602 (see FIG. 6). The closing order 602 contains the elections identifier elect, the Polling Station 104 identifier and the state of the Polling Station 104 ("Closed"). Optionally, the closing order 602 can contain the closing date and hour. To prevent falsifying the closing order 602, it is digitally signed with the private key $S_{EB}^{(ADM)}$ of the Electoral Board 110. The generic form of the closing order 602 would be then:

elect|PS|"Closed"|$S_{EB}^{(ADM)}$[H{elect|PS|"Closed"}]

After receiving the closing order 602 duly signed by the Electoral Board 110, the Polling Station 104 makes it public. This way, it will be evidenced to the following Voter Agents 116 which try to connect, that the Polling Station 104 is already closed. The Electoral Board 110 waits, after sending the closing order 602, the immediate receipt by the Polling Station 104 of the digital signature of the whole of the digital ballot box jointly with the identities of the voters that it is currently processing. Said digital signature prevents that the Polling Station 104 can accept new ballots once it is closed. After receiving said data, the Electoral Board 110 awaits a preset maximum time in order that the Voter Agents 116 who did not complete the Vote Casting Protocol 206 can complete it. After all the Voter Agents 116 pending have finished or that the maximum waiting time elapses, the Polling Station 104 transfers the complete digital ballot box to the Electoral Board 110. This transfer is made with a secure connection such as that above detailed.

After the digital ballot box is received, the Electoral Board 110 proceeds to start the Tallying Process 210. The first task to carry out at the Tally Site 108 consists in verifying that the digital ballot box received tall yes with the digital signature received immediately after issuing the closing order 602, adding anyway the digital envelopes of the voters who are completing the Vote Casting Protocol 206. With this, the Electoral Board 110 can verify that no votes has been added beyond the term nor any possibly valid ballot has been suppresses. The Tally Site 108 also verifies the proofs of authenticity associated to each of the envelopes in the ballot box. Said verification allows assuring that votes have been only cast by the qualified voters of the electoral roll and that they did it only once. In the first, second and fourth authenticity options presented, the Tally Site 108 verifies the digital signature attached to the digital envelope (in the second option it must first open the external digital envelope with the private key $S_{EB}^{(ADM)}$ of the Electoral Board (110). In the third option, after opening the external digital envelope with the private key $S_{EB}^{(ADM)}$ of the Electoral Board 110, it verifies that the private voter's identifier, PVI, corresponds to the voter identifier V. The Tally Site 108 also verifies the correct presence of the opening order 402 attached to each digital envelope. The Tally Site 108 also compares the ballot box received with the confirmations sent by the Voter Agent 116 during the last step of the Vote Casting Protocol 206.

In the event of finding two or more digital envelopes from a same voter (in the event that the electoral process allows it), only one of them will be considered valid. The mark of time, time, can be used signed by the voter, to determine the precedence order of the ballots from a same voter and chose for example the last of them. The possibility of issuing more than one digital envelope by each voter could be useful also to protect electronic voting against the individual coercion by means of same technique of coercion codes typical of the devices of electronic alarm. In this case, each digital envelope would have a coercion code attached. All the codes would have same format, but one of them would be the correct one (indicating lack of coercion) and the rest of them would be incorrect (indicating coercion). If the voter was coerced during the moment of casting the vote, he could chose to issue a false ballot, in the presence of the coercing people, associating to it an incorrect coercion code. This could be repeated as many times as it is required. In a given moment when the voter verifies that there is no coercion, he could issue his definitive vote, associating it to the correct code. Only said ballot would be included in the final recount, the rest being the digital envelopes with incorrect codes refused in the Tallying Process 210. To prevent that a voter maliciously issues a high number of ballots having an incorrect coercion code, a minimum time can be set between the acceptance of two successive ballots from a same voter.

To proceed to tabulating the ballots, at the Tally Site 108, the digital must be open to have access to their content. Said digital envelopes only can be open when the minimum threshold of members of the Electoral Board 110 specified in the secrets sharing protocol contributes with his portions, and the private key $S_{EB}^{(ENV)}$ of the Electoral Board 110 can be reconstructed. When opening the digital envelopes it must be accompanied with a random permutation of the position of the ballots, to prevent the correlation between the identities of the voters (proofs of authenticity which are attached to the ballots) and the respective ballots (data within the digital envelopes). This process of mixing ballots can be based on the techniques introduced in [Gülcü, C. and Tsudik, G. *Mixing E-mail with BABEL,* ISOC Symposium on Network and Distributed System Security, February 1996] and applied to electronic voting schemes in [Riera A. and Borrell J. *Practical approach to anonymity in large scale electronic voting schemes.* Proc. of 1999 Network and Distributed System Security Symposium, pp. 69-82, Internet Society, 1999]. Anyway, the software implementing the process of mixing ballots must be duly audited and certified to guarantee that no operation will be carried out other than the cryptographic processes and protocols of this invention.

The Tally Site 108 verifies the validity of each ballot when the digital envelope has been open which contained it. The integrity and coherence of every data contained in the digital envelope has to be verified. The voting receipt must be duly validated by the Polling Station 104 and must effectively correspond to the identifier of the ballot contained in the digital envelope, in the configuration with identifies of linked ballots). It is also verified, in the case that the ballot identifier has been obtained jointly between the Voter Agent 116 and the Polling Station 104, that the Voter Agent 116 really used the correct ballot identifier. In general, the ballot as a whole must contain no formal defect. If it does, the ballot is considered a void ballot. A Voter who obtained a correct and validated voting receipt and despite it delivered a badly constructed ballot will be not able to file a valid claim due to the authenticity proof which is attached to the digital envelope containing the badly constructed ballot, and the voting voucher. The Electoral Board 110 will be capable to demonstrate the fraud committed by the voter without it is necessary to disclose any of his private keys $S_{EB}^{(ENV)}$, or $S_{EB}^{(ADM)}$. It is enough to disclose the session symmetric key or keys that the voter used to close the digital envelope or envelopes. Any independent auditing third party can take the digital envelope, the voting voucher, and the proof of authenticity, and verify the authenticity of the session symmetric key announced by the Electoral Board 110 by only encrypting it with the public key $P_{EB}^{(ENV)}$ or $P_{EB}^{(ADM)}$ depending on the digital envelope. With the corresponding symmetric key, the envelope can be open to verify that it does not contain a well-constructed ballot.

After all the digital envelopes have been open and mixed, the private key $S_{EB}^{(ENV)}$ of the Electoral Board 110 is destroyed, as well as the portions which allow its reconstruction (as well if it is located in the personal devices of the member of the Electoral Board 110 as well as if it is located at the Tally Site 108 itself). Optionally, said private key or the portions which allow its reconstruction are stored with a fully restricted access with the purpose of auditing they later.

Then, the results to be published can be prepared from all the valid ballots. The results to be published consist in two differentiated data structures. First, the results in an abridged format (listing of vote option with the total number of ballots for each of them). Second, the Tally Site 108 prepares a list with an input for each valid ballot, which will be used for the purpose of the voters verifying the results. In the configuration with non linked ballot identifiers, said list of data to verify contains all the identifiers of ballots ident which resulted valid. In the configuration with ballot linked identifiers, the list of data for verifying contains all the vote identifiers with their respective voting options identlvote attached. In addition, in the event that a blind digital signature has been used at the fourth step of the Vote Casting Protocol 206, each input in the list of data for verifying can contain the corresponding validated voting receipt.

In addition, the results in abridged format as the list of data for verifying must be digitally signed by the Electoral Board 110 with its key $S_{EB}^{(ADM)}$ and finally transmitted from the Tally Site 108 to the Publication Site 106. For this purpose, the Electoral Board 110 activates the Results Transfer Protocol 212. This sending step is carried out by means of a secure connection as the one shown above in detail. After receiving the results to be published, the Publication Site 106 makes them publicly accessible through the Communication Network 114. Said publication of results has two objectives—disclosing the electronic final results and allowing the individual verifiability of the voters, through the list of data for verifying and the Verification Protocol 214.

The objective of the Verification Protocol 214 is to provide sufficient confidence to the voters with respect to the treatment their respective ballots received. For this, each voter who wishes it may have access to the Publication Site 106 by means of his Voter Agent 116 and carry out a search in the data list for verifying, with the aim of tracing his respective ballot identifier. Depending on how the voting method has been configured, the guaranties offered to the voters are different. When the ballot identifier has been traced in the list of data for verifying, the configuration with non linked ballot identifiers guarantees the voter the correct receipt of his ballot by the Tally Site 108 and the Electoral Board 110. In the case of the configuration with linked ballot identifiers, the voter not only verifies the correct receipt of his ballot at the Tally Site 108, but also the correct presence of his ballot in the final results, as the vote identifier has attached its own voting option (the coherence between the abridged results and the list of data for verifying can be universally controlled by any third party). Although the second of that configurations shows high characteristics with respect to verifiability, the first fully prevents the coercion and the sale of votes based on the voting receipt processing. In the second configuration, the coercion and the sale of votes based on the voting receipts processing are prevented by concealing to the voters themselves the ballot identifiers and the voting receipts, until the moment of the Verification Protocol 214. This can be done with full guaranties only in the event that a suitable hardware device has been associated, such as a tamper-proof smart card, at each Vote Casting Platform 102.

The concrete actions a voter must perform during the Verification Protocol 214 can slightly differ depending on the configuration established by the fourth step of the Vote Casting Protocol 206 (see FIG. 5). In the configuration with non linked ballot identifiers, the Voter Agent 116 obtains from the Publication Site 106 the list of data for verifying consisting in all the ballot identifiers processed at the Tally Site 108. Said list must be preferably located indexed so that the search of a particular ballot identifier can be efficiently carried out by the voter (even by hand). Each voter is then capable of locating his corresponding ballot identifier in the list. In the event that the ballot identifier is not traced, the voter can file a public claim (which does not disclose which was actually the ballot selected) by producing the validated voting receipt, jointly with the voting voucher.

In the configuration with linked ballot identifiers, the voter obtains from the Publication Site 106 the list of data for verifying, consisting in all the ballot identifiers with their respective voting options attached. Said list must be coherent with the totals for each voting option (abridged results). This coherence must be universally verified, by any third party. The voter does not know which the ballot identifier which corresponds to him is. His ballot identifier, stored in the Vote Casting Platform 102 is protected (by means of a tamper-proof hardware device or by means of a protecting software) and is not accessible to the voter. Said protection allows the access to the ballot identifier by the Voter Agent 116 only in the case that the list of data for verification corresponding to the elections in progress has already been published, digitally signed by the Electoral Board 10 with his key $S_{EB}^{(ADM)}$. After the Voter Agent 116 has available the list of data for verifying and the ballot identifier, he can trace said identifier in said list. For this, the list must be preferably indexed so that the search of an identifier of a particular ballot can be efficiently carried out. In the event that the ballot identifier is not traced, the Voter Agent 116 facilitates the voting receipt, which until that moment was protected, to the voter. The voter can file a public claim, producing the validated voting receipt, jointly with the voting voucher. Said claim evidences the omission of a valid ballot in the results published without disclosing which the actual voting option was selected.

The individual verifiability by each voter is not only suitable to provide guaranties to the voters about the correct treatment of their ballots, but it also results very effective for detecting general manipulations of the results. A small proportion of voter's verification is sufficient in order that the probability of a non detected manipulation is sufficiently minimized. To guaranty this minimum verifying the possibility is contemplated of randomly selecting a group of voters in order they carry out the Verification Protocol 214.

Within the frame of the Verification Protocol 214, downloading from the Publication Site 106 the list of data for verifying can be highly inefficient because the list of data can have an arbitrarily big size. In the configuration with non linked ballot identifiers, the size is directly proportional to the number of voters. In the configuration with linked ballot identifiers, the size depends on the number of voters as well as the size of the voting options. In fact, for the verification it would be sufficient to partly unload the data, making sure that in said part unloading the ballot identifier involved is to be found. In the first configuration, said partial downloading can be easily structured, distributing all the ballot identifiers in mutually excluding sub-lists, each of which comprises given ranges for the ballot identifiers. The Verification Protocol 214 consists in downloading the suitable sub-list (the voter is capable of easily determining it due to its indexation by the ballot identifier) and tracing the right ballot identifier in the downloaded sub-list. However, in the second configuration, the partial data downloading must be carried out with more caution, because it can mean a threat for the privacy of the voters (no mere ballot identifiers are downloaded but they have their respective voting options attached). In an extreme case, for example, a partial downloading of a set of coincident inputs with respect to the selected ballot option, would completely interfere with the voter privacy.

This invention includes a pair of mechanisms to allow the partial downloading of data for verifying them, without interfering at all with the voter's privacy. The first of them is based on splitting the list of data for verifying, at the Tally Site 108, into subassemblies having an approximately same number of inputs and so that each of said subassemblies approximately contains the same proportion between voted options as in the global results. As it is dealt with subassemblies having same proportions as those disclosed in the global results, the voter's privacy when downloading one of said subassemblies is still guarantied. The simpler case of splitting consists in grouping the inputs in a unique subassembly which covers the full list (in this case, downloading the data in fact would be not partial but total). The following case would consist in splitting the data list into two subassemblies, so that downloading would be in fact partial affecting only half the inputs. FIG. 7a graphically illustrates this possibility. The data list could also be split into three subassemblies, four subassemblies, and so on, achieving a higher efficiency when greater is the number of subassemblies (and therefore, smaller is the subassembly size). FIG. 7b shows a splitting into four subassemblies. However, the efficiency of data partial downloading for verifying cannot be indefinitely improved. To fully guaranty the voter's privacy, it is required that all the voting options are represented in every and each resulting subassembly. In some cases, the efficiency of data partial downloading could be improved, by separately treating some of the voting options (the most minority options) without taking them into account to carry out the splitting. Inputs corresponding to said options would be fully included in every and each subassembly. FIG. 7c graphically shows said possibility.

Grouping the inputs in different subassemblies is carried out from the modular division of the ballot identifiers (they must be random values having an even distribution) by the number of subassemblies. Said modular division produces mutually excluding assemblies, with approximately the same number of inputs and with approximately the same proportion between the voted options and the global results. To accurately determine which of the input assemblies must be downloaded during the Verification Protocol 214, the Voter Agent 116 only must perform the modular division of the corresponding ballot identifier by the number of subassemblies (information provided by the Publication Site 106 digitally signed by the Electoral Board 110). Said process does not threaten at all the voter privacy.

The second mechanism of data partial downloading for verifying allows that the voter decides the approximate number of ballots he is willing to download $N_v$. The Publication Site 106 makes that the maximum ballot identifier $ident_{MAX}$, the minimum ballot identifier $ident_{MIN}$ and the number of votes issued $N_{TOTAL}$ are accessible. With this information, the Voter Agent 116 calculates an interval of about $N_v$ ballots which contains his ballot identifier ident. The interval is defined by an initial identifier $ident_{INI}$ and a final identifier $ident_{END}$ where $ident_{INI}$ is randomly selected so that it meets following restriction:

$$ident < ident_{INI} + (((ident_{MAX} - ident_{MIN}) \cdot N_V)/(N_{TOTAL}))$$

The $ident_{END}$ value is then calculated as:

$$ident_{END} = ident_{INI} + (((ident_{MAX} - ident_{MIN}) \cdot N_V)/(N_{TOTAL}))$$

In a trivial way it is then met that $ident_{INI} < ident_{END}$. If the total number of ballots ($N_{TOTAL}$) is high, the ballot identifiers will be evenly distributed and it will be achieved that the number of ballot identifiers comprised between $ident_{INI}$ and $ident_{FIN}$ will be approximately equal to $N_v$.

If $ident_{INI}$ is smaller than $ident_{MIN}$, it is recalculated as follows:

$$rest = (ident_{MIN} - ident_{INI}) - 1$$

The new $ident_{INI}$ will be:

$$ident_{INI} = (ident_{MAX} - rest)$$

If $ident_{END}$ is higher than $ident_{MAX}$ it will be proceeded in same way.

$$rest = (ident_{END} - ident_{MAX}) - 1$$

The new $ident_{MAX}$ will be:

$$ident_{END} = (ident_{MIN} + rest)$$

The Voter Agent 116 sends $ident_{INI}$ and $ident_{FIN}$ to the Publication Site 106 and this later sends the ballot identifiers comprised in the interval. In the event that $ident_{INI}$ is higher than $ident_{FIN}$ the Publication Site 106 sends following intervals: ($ident_{MIN}$, $ident_{FIN}$) and ($ident_{INI}$, $ident_{MAX}$). This second option is indicated for the elections having a great number of votes cast, where the identifiers are evenly distributed. In the event that the number of votes is low, it is possible that the voter downloads more ballots than wished, or very little ballots, interfering this way against the voting privacy.

The operations of the process for vote casting above disclosed will be carried out with the assistance of a computer program which can be directly loaded in the internal memory of a digital computer, which comprises parts of a code of computer program to carry out said operations, said program comprising parts thereof distributed between the Polling Station 104 and the Vote Casting Platform(s) 102.

Also the operations of the verification process and/or the claiming process as it was already explained will be carried out with the assistance of a computer program prepared to be directly loaded in the internal memory of a digital computer and which comprises parts of a computer program code to carry out said operations, said program comprising parts thereof distributed between the Publication Site 106 the Tally Site 108 and the Vote Casting Platform 102.

The invention also provides a computer program which can be directly loaded in the internal memory of a digital computer, the program being executed in said Tally Site 108 and which comprises parts of a computer program code to carry out the operations of the Tallying Process as it has been disclosed above.

The invention in addition provides a computer program which can be directly loaded in the internal memory of a digital computer and which comprises parts of a computer program code distributed between the Polling Station 104 and the Tally Site 108.

The invention claimed is:

1. A secure electronic voting method which uses at least a computer device acting as a vote casting platform, a computer server acting as a polling station designed to receive and accumulate ballots in a digital ballot box during a preset voting period of time, a computer device acting as a tally site for the ballots and a computer device acting as a publication site of the results, said polling station, site and publication site being scattered, or, grouped together in a same computer device, each of said polling station, tally site and publication site being provided with computing means and interconnected to each other, when scattered, through at least a communication network comprising cryptographic processes and protocols in order to guarantee a series of specific safety requirements of an electoral process throughout the execution of the method and the electoral process, said method comprising the following steps:

a) providing an electoral board operating said tally site with at least a pair of asymmetric keys and allowing access to a private key or a private component of one of said pair of keys, only to a number of members of the electoral board determined by a given threshold or all of the members of said electoral board according to a cryptographic protocol of secret sharing;

b) starting a process of acceptance of the votes at the polling station;

c) each voter casting a vote electronically through a set of programs acting as a voter agent and using at least one vote casting platform, the vote casting step comprising sub-steps of:

the voter making a voter choice, the voter generating a unique ballot identifier that is a pseudo random number to identify each vote cast without probable repetitions thereby identifying each of the vote by means of selecting a value for the unique ballot identifier within a predetermined range, the voter obtaining a voting receipt which provides validity at least to said unique ballot identifier for said electoral process and which verifies the results of the voting without disclosing content of the voter choice, the voter constructing a digital envelope protecting voter's privacy by using a public component of said at least one pair of asymmetric keys of the electoral board, said digital envelope containing at least the voter choice, after or before said sub-steps, carrying out a voter authentication proof, and generating a proof of delivery of said digital envelope in the polling station which is transmitted to the voter agent as a voting voucher of having cast the vote for each voter, fully separate from non-coded voter choice;

d) ending said process of ballots acceptance at said polling station;

e) the members of the electoral board collaborating so that they have access to said at least one pair of asymmetric keys including the private key or said private component and using said private component to have access to the content of the digital envelope; and f) counting and tabulating the voter choice of each voter and publishing the results at the publication site and allowing said voter to verify said results by using said voting receipt without disclosing the voter choice through accessing the results published on the publication site, which contain the voter's unique ballot identifier, carrying out a search of the unique ballot identifier and allowing the voter to file a claim supported on said voting receipt and said voting voucher in the event of lack of the unique ballot identifier in the results published, without disclosing the voter choice.

2. A computer program which can be directly loaded in the internal memory of a digital computer and comprises parts of computer program codes that are readable by a computer system to carry out a vote casting process operation in which each voter casts a vote electronically through a set of programs acting as a voter agent and using at least one computer device acting as a vote casting platform, comprising sub-steps of: the voter making a voter choice, the voter generating a unique ballot identifier, the voter obtaining a voting receipt which provides validity at least to said unique ballot identifier for said electoral process and which verifies the results of the voting process without disclosing content of the voter choice, the voter constructing a digital envelope protecting voter's privacy by using a public component of at least one pair of asymmetric keys of an electoral board, said digital envelope containing at least the voter choice, after or before said sub-steps, carrying out a voter authentication proof, generating a proof of delivery of said digital envelope in a computer server acting as a polling station which is transmitted to the voter agent as a voting voucher of having cast the vote for each voter, fully separate from non-coded voter choice;

wherein said program also comprises parts of computer program codes that are readable by a computer system to carry out a vote verification process operation that allows said voter to verify the voter's vote by accessing the results published on a computer device acting as a publication site, which contain the voter's unique ballot identifier, carrying out a search of the unique ballot identifier and allowing the voter to file a claim supported on said voting receipt and said voting voucher in the event of lack of the unique ballot identifier in the results published, without disclosing the voter choice.

3. The method according to claim 1, wherein said voting voucher is validated by means of a digital signature by said voter during a preceding step with the private key or the private component of the at least one pair of asymmetric keys at said polling station.

4. The method according to claim 1, comprising an additional sub-step in step c consisting in the voter agent sending the vote casting voucher or part of it to the electoral board.

5. The computer program according to claim 2 comprising further vote casting process operations implemented by said voter agent and said polling station, in which said ballot identifier of the step c is a pseudo random number to identify the voter choice of each voter without probable repetitions, said value being determined by a cryptographic protocol between the voter agent and the polling station so that the polling station does not obtain any knowledge of the value generated.

6. The method according to claim 1, characterized in that from said ending of the period of ballots acceptance, a mixing of the digital envelopes received is completed at said tally site, randomly permuting order of all or part of said digital envelopes.

7. The method according to claim 6, characterized in that it provides said polling station with at least a pair of asymmetric keys.

8. The method according to claim 7, characterized in that at the step c said digital envelope additionally contains at least one of following data: said voting receipt, said unique ballot identifier, an identifier of the electoral process in progress, an order for opening the voting period of time.

9. The method according to claim 8, characterized in that it comprises an additional step for generating, from a preset voter roll, a pair of asymmetric keys for each voter, certifying that the public key or public component of the pair of keys generated and keeping in a secure way the private key or component.

10. The method according to claim 9, characterized in that said voter private component stands in a computing device of the voter, in a trustworthy secure device having a microprocessor incorporated or stands at the polling station with which the voter is interacting, protected by means of a symmetric encryption using a key, secure password, said key or password being secretly disclosed to the voter or being directly selected by the voter, and in that at the beginning of the process of vote casting, said protected private component is sent to the voter by means of said communication network and is locally unprotected when providing said secure password to the voter.

11. The method according to claim 9, characterized in that said voter authentication proof with respect to the polling station of the step c consists in a strong authentication cryptographic protocol based on public key cryptography.

12. The method according to claim 9, characterized in that said voter authentication proof of step c consists in the digital signature by the voter agent on at least said digital envelope with the voter private key, before delivering it to the polling station.

13. The method according to claim 9, characterized in that said voter authentication proof of the step c consists in the construction of a second digital envelope using the public component of said at least one pair of asymmetric keys of the electoral board, and where said second digital envelope contains at least said first digital envelope and the digital signature from the voter agent with the voter private key, of at least a value, as the elections identifier, the voter identifier or a pseudo random value, so that, to verify the authenticity of said two digital envelopes at the step f, said second digital envelope must be open.

14. The method according to claim 8, characterized in that said voter authentication proof of the step c consists in the construction of a second digital envelope by using the public component from one of said at least one pair of asymmetric keys of the electoral board, and where said second digital envelope contains at least said first digital envelope and a password, or secret personal identification number, so that, for verifying the authenticity of said two digital envelopes at the step f, said second envelope has to be open.

15. The method according to claim 9, characterized in that said voter authentication proof at the step c consists in the digital signature from the voter agent of at least one value, including the voter identifier, the electoral process in progress identifier or a pseudo random value, with the private key of a pair of asymmetric keys where the public component of said pair of keys is derived from said digital envelope.

16. The method according to claim 8, characterized in that said ballot identifier of the step c is a pseudo random number to allow to univocally identify the voter choice of each voter without probable repetitions, said value being determined by the voter or the voter's voter agent who uses a system including a pseudo random sequence generator or a source of natural noise.

17. The method according to claim 8, characterized in that said ballot identifier of the step c is a pseudo random number to allow to univocally identify the voter choice of each voter without probable repetitions, said value being determined by a cryptographic protocol between the voter agent and the polling station so that this latter does not obtain any knowledge of the value generated.

18. The method according to claim 8, characterized in that said voting voucher of the step c is derived from said ballot identifier and/or an electoral process in progress identifier, and said voting receipt is validated by the polling station by means of a method of the digital signature with a private component of said at least one pair of asymmetric keys of said polling station.

19. The method according to claim 8, characterized in that said voting receipt of the step c is derived from at least one of the following data: said ballot identifier, an electoral process in progress identifier, and the voter choice and said receipt is validated by the polling station without this later has access to the information contained in the receipts nor it is able later to correlate said receipts with their corresponding voters.

20. The method according to claim 19, characterized in that said voting receipt is validated by means of the digital signature or by means of a blind digital signature protocol, with a private component of said at least one pair of asymmetric keys of said polling station.

21. The method according to claim 19 characterized in that said voting receipt is validated by means of a digital signature with a private component of said at least one pair of asymmetric keys of said polling station, when said voting receipt has been encrypted by means of a probabilistic cryptosystem or a symmetric cryptosystem, using a session key generated by the voter agent.

22. The method according to claim 17, characterized in that said digital envelope further contains necessary information for verification that said ballot identifier is obtained correctly.

23. The method according to claim 18, characterized in that said digital envelope further contains information necessary for verifying the validity of the voting receipt.

24. The method according to claim 8, characterized in that said starting of the step b is executed from an order opening the voting period and said ending of the step d is executed from an order closing the voting period, said opening and closing orders being generated by the electoral board.

25. The method according to claim 24, characterized in that said order for opening the voting period comprises at least one of the following data: an electoral process in progress identifier, a polling station identifier, an indication about an "open" state of the polling station, a value indicating a probability of issuing a voucher of vote casting at the electoral board by the voter agent, date and time of opening the voting period and the digital signature of the electoral board, with the private key or the private component of one of the pairs of asymmetric keys of said electoral board on said data of the opening order.

26. The method according to claim 24, characterized in that said closing order of the voting period comprises at least one of the following data: an electoral process in progress, an identifier of the polling station, an indication about a "closed" state of the polling station, the closing date and time of the voting period and the digital signature of the electoral board, with the private key or the private component of one of the pairs of asymmetric keys of said electoral board, on said data of the closing order.

27. The method according to claim 8, characterized in that said cryptographic protocol for sharing the secret on said step a comprises the sub-step of splitting the private key or the private component of said at least one pair of asymmetric keys of the electoral board into several fragments or portions which are distributed between several control agents or members of the electoral board and stored in corresponding individual devices having a protected memory, and in that said step e comprises the sub-step of gathering said fragments or portions at said tally site and reconstructing said private key or said private component of said at least one pair of asymmetric keys of the electoral board.

28. The method according to claim 8, characterized in that said cryptographic protocol of sharing the secret of the said step a comprises the sub-step of splitting the private key or the private component of said at least one pair of asymmetric keys of the electoral board into several fragments or portions which are stored, separately, at said tally site protected by means of a system with a symmetric encryption using secure keys or passwords which are distributed between the different control agents or members of the electoral board which store them in a protected and/or secure way and in that said step c comprises the sub-steps of gathering at said tally site said keys or passwords unprotecting with them the portions of said private component and proceeding to reconstruct said private key or said private component of said at least one pair of asymmetric keys of the electoral board.

29. The method according to claim 8, characterized in that at least one part of the vote casting platforms is tamper-proof or protected against a non allowed access, allowing to store sensible data obtained during the cryptographic protocols of the vote casting process, restricting the access to said data for the voter until a given condition is met.

30. The method according to claim 8, characterized in that, when the voting period is finished, the electoral board sends to the polling station a closing order from which moment no new connections are accepted from the voter agent for which the polling station carries out following operations:

g) obtaining a cryptographic summary of the sets of digital envelopes issued or digital ballot box;

h) obtaining a cryptographic summary of the voter identifiers which having started the vote casting process still did not complete it;

i) sending to the electoral board the two preceding cryptographic summaries or a single summary of said set of digital envelopes with said voter identifiers who did not still complete the vote casting process; and j) after a predetermined time elapses which allows the voters which were still voting to end the vote casting process, sending the complete digital ballot box to the electoral board;

said one or more summaries of the operations g), h) and i) optionally depending on the size of the respective structure of data to be summarized.

31. The method according to claim 30, characterized in that the polling station digitally signs at least one of the following data: set of digital envelopes cast or digital ballot box, identifier of voters who having started the process of casting their vote still did not complete it, using for this a private component of said at least one pair of asymmetric keys of the polling station.

32. The method according to claim 8, characterized in that when tabulating the voter choices of all the voters is complete, the private key or the private component of said at least one pair of asymmetric keys of the electoral board of the step e is destroyed or it is stored with a fully restricted access facilitating further audits, and the digital ballot box formed by all of the currently presented digital envelopes is also stored so that it can be audited later.

33. The method according to claim 17, characterized in that said validated voting receipt or any other information generated during the vote casting process, including said ballot identifier, which allows the voter to reliably verify which was the voter's voter choice is kept concealed by using a secure tamper-proof device.

34. The method according to claim 17, characterized in that said validated voting receipt or any other information generated during the vote casting process, including said ballot identifier which allows the voter to reliably verify which was the voter's voter choice is kept concealed with a restricted access and is only accessible after the electoral process results have been published to verify the results or only it is accessible in the event of lack of the ballot identifier in the results.

35. The method according to claim 8, characterized in that said verification process carried out by the voter comprises following operations:

k) grouping the ballot identifiers in subassemblies having approximately the same number of identifiers, the simplest case being a unique subassembly containing all of the ballot identifiers;

l) the voter agent determining from the subassembly of ballot identifiers what the ballot identifier corresponding to the voter contains, from said ballot identifier or from a complementary information provided by the publication site;

m) downloading from that publication site said ballot identifiers subassembly and local verification by the voter agent or the voter, of the correct presence of the ballot identifier corresponding to the voter.

36. The method according to claim 8, characterized in that said verification process carried out by the voter comprises following operations:

n) grouping the ballot identifiers jointly with their corresponding voter choices in subassemblies having approximately the same number of identifiers and so that each of said subassemblies contains approximately the same proportion between the voted options as in the global results, the simplest case being a unique subassembly containing the whole of the ballot identifiers;

O) the voter agent determining the ballot identifier subassembly which contains the ballot identifier corresponding to the voter, from said ballot identifier or from a complementary information facilitated by the publication site;

p) downloading from the publication site said ballot identifier subassembly jointly with the corresponding voter choice and local verification by the voter agent or the voter, of the correct presence of the ballot identifier corresponding to the voter and the previously selected voter choice.

37. The method according to claim 35, characterized in that the electoral board carries out a digital signature of each of the said subassemblies.

38. The method according to claim 36, characterized in that the number of said subassemblies of ballot identifiers and voter choice is obtained by separately treating some of said voter choices without taking them into account to carry out said grouping in subassemblies and, after said grouping, including said untreated voter choices with voters' corresponding ballot identifiers in every and each said subassemblies.

39. The method according to claim 8, characterized in that possibility of verification is carried out by a minimum voters group randomly selected among the voters.

40. The method according to claim 8, characterized in that all sensible cryptographic operations to be carried out by the voter agent during the vote casting process and the verification process are carried out within a secure tamper-proof device, including a card with a microprocessor incorporated or an identification module from a mobile telephony terminal having cryptographic capacities.

* * * * *